United States Patent
Battle et al.

(10) Patent No.: US 11,561,794 B2
(45) Date of Patent: Jan. 24, 2023

(54) EVICTING AND RESTORING INFORMATION USING A SINGLE PORT OF A LOGICAL REGISTER MAPPER AND HISTORY BUFFER IN A MICROPROCESSOR COMPRISING MULTIPLE MAIN REGISTER FILE ENTRIES MAPPED TO ONE ACCUMULATOR REGISTER FILE ENTRY

(71) Applicant: International Business Machines Corporation, Armonk, NY (US)

(72) Inventors: Steven J. Battle, Philadelphia, PA (US); Brian W. Thompto, Austin, TX (US); Dung Q. Nguyen, Austin, TX (US); Cliff Kucharski, Austin, TX (US); Susan E. Eisen, Round Rock, TX (US); Salma Ayub, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/331,085

(22) Filed: May 26, 2021

(65) Prior Publication Data
US 2022/0382549 A1 Dec. 1, 2022

(51) Int. Cl.
*G06F 9/30* (2018.01)
*G06F 9/38* (2018.01)

(52) U.S. Cl.
CPC ........ *G06F 9/30112* (2013.01); *G06F 9/3012* (2013.01); *G06F 9/384* (2013.01); *G06F 9/3861* (2013.01)

(58) Field of Classification Search
CPC ...... G06F 9/384; G06F 9/3861; G06F 9/3012; G06F 9/30112
See application file for complete search history.

(56) References Cited

U.S. PATENT DOCUMENTS 5,835,748 A * 11/1998 Orenstein ........... G06F 9/30192
712/217
6,237,083 B1 * 5/2001 Favor .................. G06F 9/30109
712/217

(Continued)

FOREIGN PATENT DOCUMENTS

CN 110427171 A 11/2019
CN 110737472 A 1/2020

OTHER PUBLICATIONS

Saikumar, M., et al., "Design and Performance Analysis of Multiply-Accumulate (MAC) Unit", 2014 International Conference on Circuits, Power and Computing Technologies [ICCPCT—2014] IEEE, Mar. 2014, pp. 1084-1089.

(Continued)

*Primary Examiner* — Keith E Vicary
(74) *Attorney, Agent, or Firm* — Scully, Scott, Murphy & Presser, P.C.

(57) ABSTRACT

A computer system, processor, programming instructions and/or method of processing data that includes a main register file having a plurality of entries for storing data; an accumulator register file having a plurality of entries for storing data wherein multiple main register file entries are mapped to one accumulator register file entry in the at least one accumulator register file; a logical register mapper to track and map logical registers to main register file entries, and a history buffer. Processing wide data width instructions includes evicting and restoring information from a single primary entry in the logical register mapper through a single read or write port in the logical register mapper without evicting or restoring the remaining other multiple main register file entries mapped in the accumulator register.

20 Claims, 12 Drawing Sheets

(56) References Cited

U.S. PATENT DOCUMENTS

| | | | |
|---|---|---|---|
| 6,339,823 B1* | 1/2002 | Loper, Jr. | G06F 9/3834 |
| | | | 712/E9.035 |
| 9,960,917 B2 | 5/2018 | Gopal et al. | |
| 10,007,521 B1* | 6/2018 | Tam | G06F 9/3012 |
| 10,877,756 B2 | 12/2020 | Valentine et al. | |
| 10,884,734 B2 | 1/2021 | Boswell et al. | |
| 10,949,213 B2* | 3/2021 | Battle | G06F 9/3855 |
| 11,119,772 B2* | 9/2021 | Battle | G06F 9/30043 |
| 11,132,198 B2* | 9/2021 | Thompto | G06F 9/30123 |
| 2004/0078554 A1* | 4/2004 | Glossner, III | G06F 9/3887 |
| | | | 712/23 |
| 2005/0240644 A1* | 10/2005 | Van Berkel | G06F 9/30025 |
| | | | 712/E9.046 |
| 2011/0320765 A1* | 12/2011 | Karkhanis | G06F 15/8076 |
| | | | 712/7 |
| 2012/0110305 A1* | 5/2012 | Lien | G06F 9/30123 |
| | | | 712/E9.025 |
| 2019/0012170 A1* | 1/2019 | Qadeer | G06N 3/063 |
| 2019/0171448 A1 | 6/2019 | Chen et al. | |
| 2020/0183700 A1* | 6/2020 | Battle | G06F 9/30101 |
| 2020/0183701 A1* | 6/2020 | Battle | G06F 9/30116 |
| 2020/0356366 A1* | 11/2020 | Battle | G06F 9/3012 |
| 2020/0356369 A1* | 11/2020 | Battle | G06F 9/30141 |
| 2021/0064365 A1* | 3/2021 | Thompto | G06F 9/3012 |
| 2021/0089322 A1* | 3/2021 | Battle | G06F 9/3857 |
| 2021/0173649 A1* | 6/2021 | Battle | G06F 9/3863 |
| 2021/0342150 A1* | 11/2021 | Battle | G06F 9/30032 |

OTHER PUBLICATIONS

Gautschi, M. et al., "Near-threshold RISC-V core with DSP extensions for scalable IoT Endpoint Devices", IEEE Transactions on Very Large Scale Integration (VLSI) Systems, 2017, pp. 2700-2713, 25 (10).

* cited by examiner

| LREG | VALID | ITAG | STF/ACCTag | PROD | 128b | 512b | RDY |
|---|---|---|---|---|---|---|---|
| vsr0 | 1 | 0x010 | 0x02F | VS2 | 0 | 1 | 1 |
| vsr1 | 0 | 0x002 | 0x19F | LD1 | 1 | -- | 1 |
| vsr2 | 0 | 0x003 | 0x19E | LD1 | 1 | -- | 1 |
| vsr3 | 0 | 0x004 | 0x180 | LD0 | 1 | -- | 1 |
| vsr4 | 1 | 0x00C | 0x000 | VS0 | 0 | 0 | 1 |
| vsr5 | 1 | 0x00D | 0x001 | VS0 | 1 | -- | 1 |
| vsr6 | 1 | 0x00E | 0x002 | VS0 | 0 | -- | 0 |
| vsr7 | 1 | 0x00F | 0x003 | VS0 | 1 | -- | 0 |
| ... | | | | | | | |
| vsr31 | 0 | 0x02F | 0x100 | LD0 | 1 | 0 | 1 |

Fig. 8

| | | EVICTOR (YOUNGER) | | | | | EVICTEE (OLDER) | | | | | |
|---|---|---|---|---|---|---|---|---|---|---|---|---|
| ENTRY | LREG | V | ITAG | STFtag | 128b | 512b | V | ITAG | STFtag | PROD | 128b | 512b | RDY |
| 0 | VSR0 | 1 | 0x010 | 0x02F | 0 | 1 | 1 | 0x00B | 0x02E | VS2 | 0 | 1 | 1 |
| 1 | VSR4 | 1 | 0x00C | 0x000 | 0 | 0 | 0 | 0x000 | 0x100 | VS0 | 0 | 0 | 1 |
| 2 | VSR0 | 1 | 0x00B | 0x02E | 0 | 1 | 1 | 0x001 | 0x00A | LD0 | 1 | 0 | 0 |
| 3 | VSR6 | 1 | 0x00D | 0x002 | 0 | 0 | 0 | 0x003 | 0x181 | VS1 | 0 | 0 | 1 |
| 4 | VSR5 | 1 | 0x00E | 0x001 | 1 | 0 | 0 | 0x004 | 0x182 | VS3 | 1 | 0 | 1 |
| 5 | VSR7 | 1 | 0x00F | 0x003 | 1 | 0 | 0 | 0x005 | 0x190 | LD0 | 0 | 0 | 1 |
| ... | | | | | | | | | | | | | |
| 63 | -- | - | - | - | - | - | - | - | - | - | - | - | - |

Fig. 9

EVICTING AND RESTORING INFORMATION USING A SINGLE PORT OF A LOGICAL REGISTER MAPPER AND HISTORY BUFFER IN A MICROPROCESSOR COMPRISING MULTIPLE MAIN REGISTER FILE ENTRIES MAPPED TO ONE ACCUMULATOR REGISTER FILE ENTRY

BACKGROUND OF INVENTION

The present invention generally relates to data processing systems, processors, and processor architecture, and methods of processing large data width instructions, for example for execution in dense math execution units such as, for example, one or more matrix-multiply-add (MMA) units.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware units connected in series like a pipeline or pipeline-like structure within a processor to process multiple instructions in a single processing cycle. Pipelining involves processing instructions in stages, so that a number of instructions are processed concurrently. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

A design to increase computation throughput is to have specialized computation units, e.g., matrix-multiply-accumulator units (MMA units), to handle various data types and to perform highly-parallel tasks. Wide single instruction, multiple data (SIMD) flows are one way to achieve high computational throughput. In one or more embodiments, MMA instructions use a wide dataflow, e.g., 512 bits, and map to a plurality of consecutive physical register targets that are of smaller data width (e.g., four 128-bit target registers). There is not enough port bandwidth when processing an MMA instruction to rename all the target registers at once and to evict the plurality of prior mappings from the logical register mapper to the history buffer, resulting in processor latency. Increasing the number of logical register mapper target read ports and history buffer write ports to accommodate processing the MMA instruction in a single cycle, however, would be disadvantageous in terms of silicon usage, processor power usage, critical timing paths, and wire congestion.

SUMMARY

The summary of the disclosure is given to aid understanding of a computer system, computer architectural structure, processor, processor architecture structure, register files including wide data width (accumulator) register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, processor architecture structure, register files, and/or their method of operation to achieve different effects.

A computer system, processor, and/or method for processing information is disclosed that in one or more embodiments includes: a main register file associated with the at least one processor, the main register file having a plurality of entries for storing data, one or more write ports to write data to the plurality of main register file entries, and one or more read ports to read data from the plurality of main register file entries; at least one accumulator register file having a plurality of entries for storing data, the at least one accumulator register file having a plurality of entries, and wherein multiple main register file entries are mapped to one accumulator register file entry in the at least one accumulator register file; a logical register mapper to track and map logical registers to main register file entries, the logical register mapper having a plurality of entries, wherein each logical register mapper entry has a wide data width bit field identifier, a small data width bit field identifier, and a single STF/ACCtag field to hold an ACC Tag that points to an accumulator register file entry or a STF Tag that points to a main register file entry; and a history buffer having a plurality of entries, the history buffer to receive information on instructions evicted from the logical register mapper and to restore information on instructions previously evicted from the logical mapper back to the logical register mapper. The processor is configured to process wide data width instructions using the accumulator register file and in response to processing wide data width instructions that utilize an accumulator register file entry, evicts information from a single primary entry in the logical register mapper through a single read port in the logical register mapper. In a preferred embodiment the logical register mapper comprises an ACC Free list that tracks available accumulator register file entries in the at least one accumulator register file, and the processor is configured to obtain an ACC Tag from the ACC Free List in response to detecting a first wide data width instruction that is to use an accumulator register file entry, wherein the ACC Tag points to a free accumulator register file entry.

In one or more aspects, in response to a first wide data width instruction that utilizes the accumulator register file, an accumulator register entry is primed by writing data from multiple main register file entries to a mapped accumulator register file entry. In a further aspect, in response to the first wide data width instruction, information is evicted from the single primary entry in the logical register mapper that corresponds to a single primary main register entry out of the multiple main register file entries mapped to the accumulator register file entry. In a still further aspect, in response to the first wide data width instruction, logical register mapper entries corresponding to the multiple main register file entries mapped to the accumulator register file entry other than the single primary logical register mapper entry are not evicted. In an embodiment, in response to the first wide data width instruction, non-wide data width instruction information in the single primary entry in the logical register mapper is read from a single read port in the logical register mapper and non-wide data width instruction information is written to a single history buffer entry by a single history buffer write port. In a further embodiment, first wide data instruction information is written to the single history buffer entry by the single history buffer write port. First wide data instruction information is an aspect written to the single primary entry in the logical register mapper that previously held the non-wide data width instruction. In response to writing wide data instruction information to the single primary logical register mapper entry, in an aspect the wide data width bit field identifier in the single primary logical register mapper entry is set and/or the ACC tag is written into the single STF/ACCtag field in the single primary logical register mapper entry.

In response to a subsequent wide data width register file instruction addressed to the primed accumulator register file, according to an embodiment, the first wide data width instruction information is evicted from the single primary logical register mapper entry in the logical register mapper using a single read port in the logical register mapper. In a further embodiment first wide data width instruction information is read from the single primary logical register mapper entry using the single read port in the logical register and the first wide data width instruction information is written into a single history buffer entry using a single write port in the history buffer. Subsequent wide data width instruction information in an aspect is written into the single history buffer entry using the single write port in the history buffer, and in a further aspect is configured to write subsequent wide data instruction information to the same single primary logical register mapper entry, and maintain a setting in wide data width indicator bit field and the ACC tag in the STF/ACCtag field in the single primary logical register mapper entry. In a preferred embodiment three or more consecutive main register file entries are mapped to a single accumulator register field.

The foregoing and other objects, features, and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of a computer system, computer architectural structure, processor, processor architectural structure, register files including accumulator register files, and/or their method of operation will be better understood when read in conjunction with the figures provided. Embodiments are provided in the figures for the purpose of illustrating aspects, features, and/or various embodiments of the computer system, computer architectural structure, processor, processor architectural structure, register files, wide bit width (e.g., accumulator register) files, and their method of operation, but the claims should not be limited to the precise system, embodiments, methods, processes and/or devices shown, and the features, and/or processes shown may be used singularly or in combination with other features, and/or processes.

FIG. 8 illustrates a simplified mapper table in accordance with an embodiment of the disclosure;

FIG. 9 illustrates a simplified History Buffer (SRB) table in accordance with an embodiment of the disclosure;

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, processor architectural structure, register files, wide data width (accumulator) register files, and their method of operation, however, it will be understood by those skilled in the art that different and numerous embodiments of the computer system, computer architectural structure, processor, processor architectural structure, register files, wide data width (accumulator) register files, logical register mapper, history buffer, dense math execution units, e.g., MMA units, and their method of operation may be practiced without those specific details, and the claims and invention should not be limited to the system, assemblies, subassemblies, embodiments, functional units, features, circuitry, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and their architecture, which are apparent to those skilled in the art. It is assumed that those skilled in the art are familiar with the general architecture of processors, and, in particular, with processors that include dense math execution units and process large data width instructions and use, for example, wide data width (accumulation) registers. It may be noted that a numbered element is numbered according to the figure in which the element is introduced, and is often, but not always, referred to by that number in succeeding figures.

Figure 1:
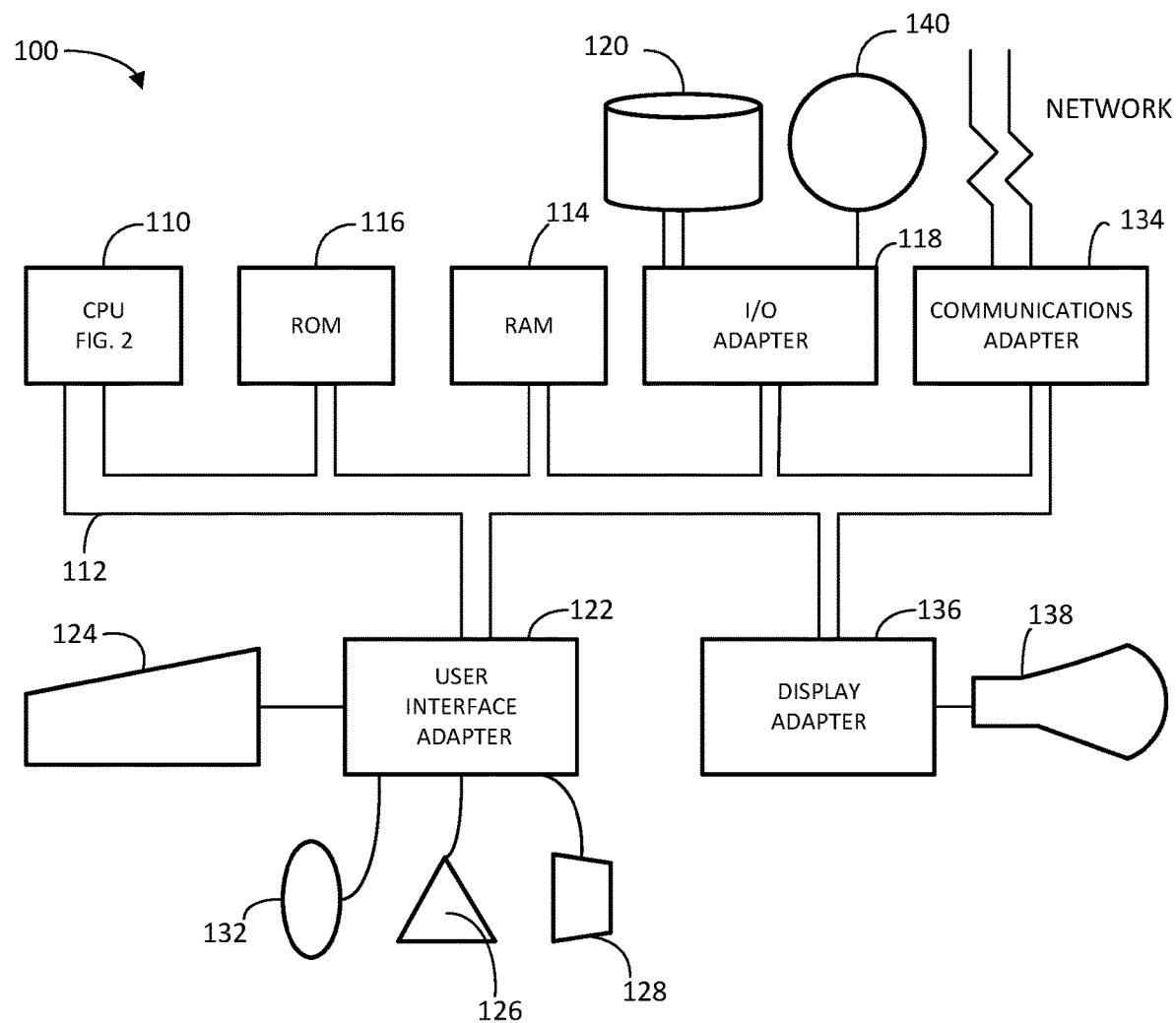
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110 also referred to as processor 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, trackball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes data according to processor cycles, synchronized, in some aspects, to an internal clock (not shown).

Figure 2:
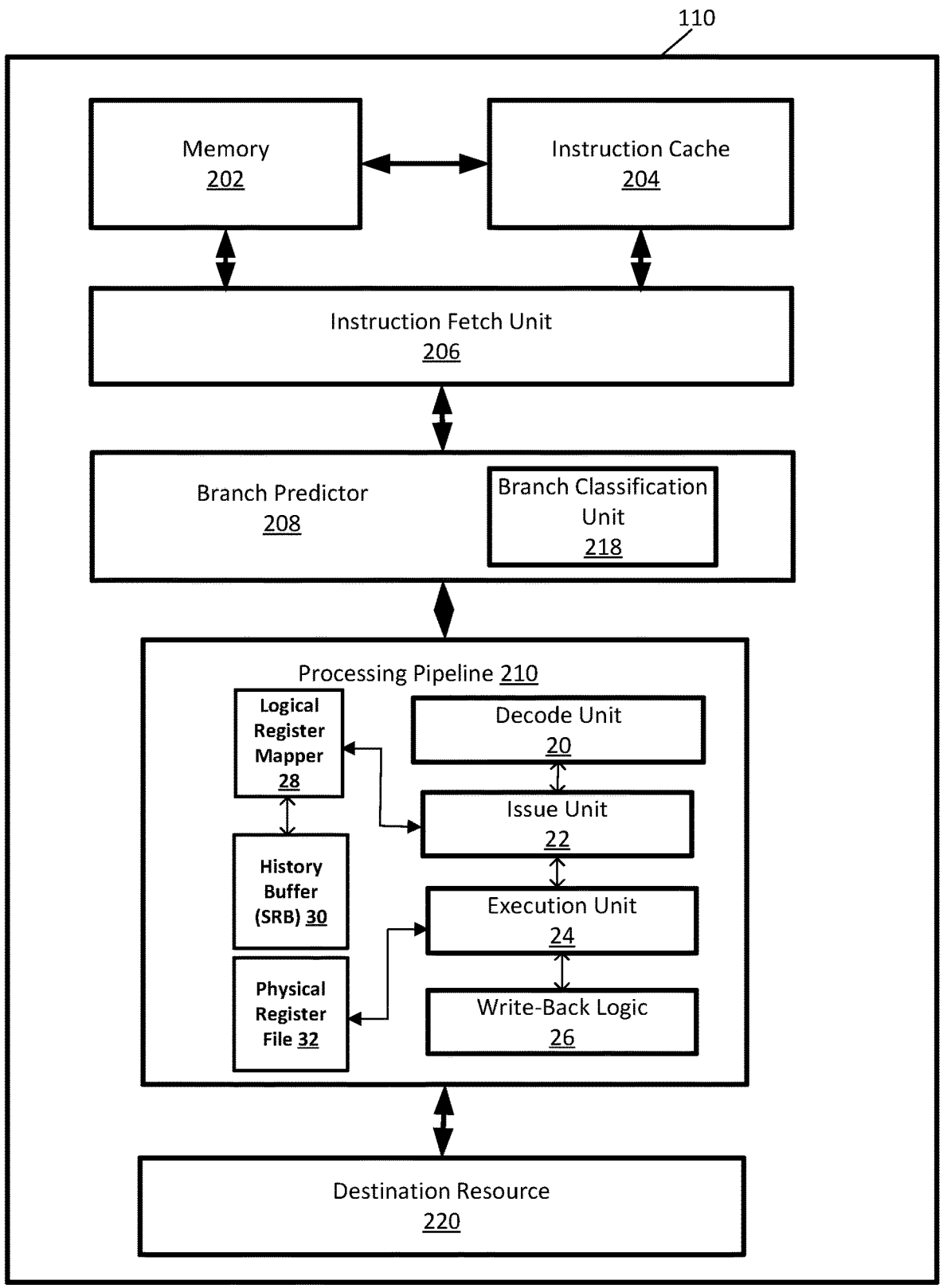
FIG. 2 illustrates a block diagram of a processor in which certain aspects of the present disclosure may be practiced.

FIG. 2 depicts a simplified block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer system or otherwise distributed within a computer system. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, a logical register mapper 28, a history buffer, e.g., Save & Restore Buffer (SRB) 30, an issue unit 22, an execution unit 24, a physical register file 32, and write-back logic 26. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units (LSUs), vector scalar execution units (VSUs), and/or other execution units. The logical register mapper 28 contains entries which provide a mapping between a logical register entry (LReg) and an entry in the physical register file 32. When an instruction specifies to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register mapper 28 when a new instruction is dispatched. In this regard, the history buffer stores information from the logical register mapper 28 when a new instruction evicts data from the logical register mapper 28 in case the new instruction is flushed and the old data needs to be recovered. The history buffer (SRB) 30 keeps the stored information until the new instruction completes. History buffer (SRB) 30 interfaces with the logical register mapper 28 in order to restore the contents of logical register mapper 28 from the history buffer (SRB) 30 back to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, 110 circuitry to communicate with other devices, other processing circuits, or any other type of destination for executed instructions or data.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages or functional units are indicated as a single logic unit in FIG. 2 for the sake of simplicity of understanding, and further detail as relevant will be provided below.

Figure 3:
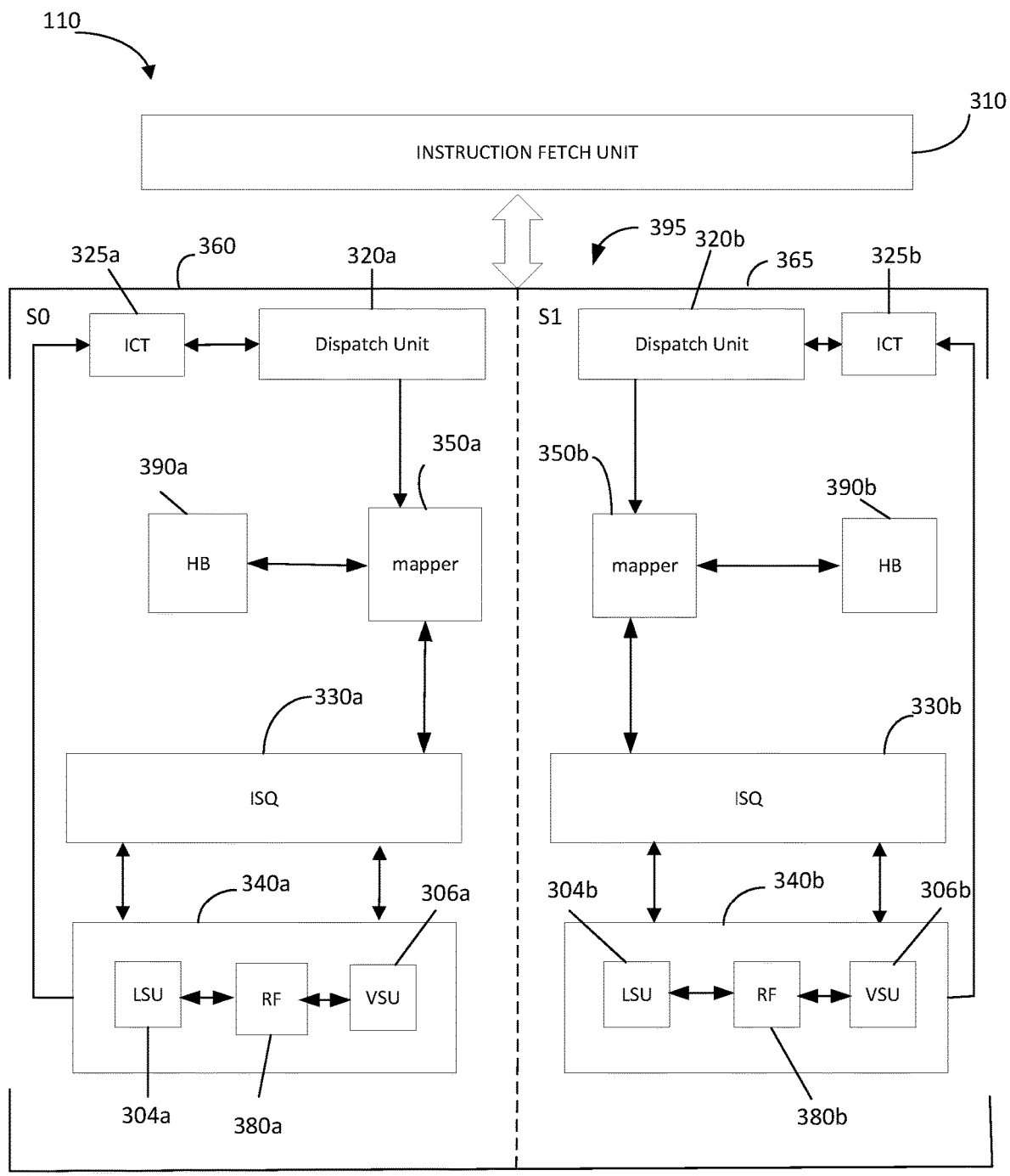
FIG. 3 illustrates a block diagram of a portion of a multi-slice processor in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices-Slice 0 (slice S0 or 360) and Slice 1 (slice S1 or 365). The processor includes an Instruction Fetch unit 310. Each of the slices S0 and S1 includes an Instruction Dispatch Unit (320a and 320b); a Logical Register Mapper (350a and 350b); a History Buffer (HB) (390a and 390b); an Issue Queue (ISQ) (330a and 330b); an Instruction Completion Table (ICT) (325a and 325b); and Execution Units (340a and 340b). Each Execution Unit (340a and 340b) includes a load store unit (LSU) (304a and 304b), a vector scalar unit (VSU) (306a and 306b), and a physical Register File (RF) (380a and 380b). The Execution Unit 340 may include one or more queues to hold instructions for execution by the Execution Unit 340.

It may be noted that the two slices are shown for ease of illustration and discussion only, and that multi-slice processor 110 may include more than two processing or execution slices with each slice having all the components discussed above for each of the slices S0 and S1 (slices 360 and 365). Further, the processing slices may be grouped into super slices (SS 395), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit 310 fetches instructions to be executed by the processor 110 or processor slice. Instructions that are fetched by the Instruction Fetch Unit 310 are sent to the Instruction Dispatch Unit 320. The Instruction Dispatch Unit 320 dispatches instructions to the Issue Queue (ISQ) 330, typically in program order. In one or more embodiments, Dispatch Unit 320 will stamp each instruction dispatched to the Issue Queue 330 with an identifier, e.g., identification tag (iTag), to identify the instruction. The Dispatch Unit 320 may stamp instructions with other information and metadata. The instructions (iTags) typically are allocated (assigned) and stamped in ascending program order on a per thread basis by the Dispatch Unit 320.

The Issue Queue (ISQ) 330 will issue instructions to the Execution Unit 340. The ISQ 330 typically holds an instruction until data associated with the instruction has been retrieved and ready for use. In certain aspects, the ISQ 330 holds a set of instructions and the physical register file 380 accumulates data for the instruction inputs. A register file may be used for staging data between memory and other functional (execution) units in the processor. There may be numerous register files and types. When all source data accumulates for the instruction, the data in one or more embodiments is passed on to one or more execution units designated for execution of the instruction. A physical register (or main register) file 380 may serve to store data to be used in an operation specified in an instruction dispatched to an Execution Unit 340, and the result of the operation performed by the Execution Units 340 may be written to the designated target register entry in the physical register file 380. Each of the execution units, e.g., LSUs 304 and VSUs 306, may make result data available on the write back buses for writing to a register file (STF) entry.

Logical register mapper 350 contains metadata (e.g., iTag, STFtag, etc.) which provides a mapping between entries in the logical register (e.g., GPR1) and entries in physical (main) register file 380 (e.g., physical register array entry). The STFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry. The Execution Unit 340 executes instructions out-of-order and when the Execution Unit 340 finishes an instruction, the Execution Unit 340 will send the finished instruction, e.g., iTag, to the ICT 325. The ICT 325 contains a queue of the instructions dispatched by the Dispatch Unit 320 and tracks the progress of the instructions as they are processed.

History buffer (SRB) 390 contains logical register (LReg) entries that are evicted from the logical register mapper 350 by younger instructions. The information stored in the history buffer (SRB) 390 may include the iTag of the instruction that evicted the logical register (LReg) entry (i.e., the evictor iTag) from the logical register mapper 350. History buffer (SRB) 390, in an embodiment, stores iTag, logical register entry number (the bit field that identifies the logical register entry (LReg)), and Register File tag (STFtag) information of the evicted instruction/logical register entry from the mapper 350. History buffer (SRB) 390 may store and track other information. History buffer (SRB) 390 has an interface (e.g., port) to the logical register mapper 350 to recover the iTag, and register file tag (STFtag) (and other metadata), for each evicted logical register entry (LREG). The information is kept in the history buffer (SRB) 390 in a history buffer (SRB) entry until the new instruction (evictor instruction) is completed. At which point, in an embodiment, the entry is removed from the history buffer (SRB) 390.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two threads (SMT2) or four threads (SMT4) are simultaneously processed.

In an aspect, each execution/processing slice may have its own physical (main) register file as shown in FIG. 3. In another aspect, one physical (main) register file may be allocated per super slice and shared by the processing slices of the super slice. In one aspect, one physical (main) register file may be allocated to more than one super slice and shared by the processing slices of the super slices. For example, slices S0, S1, S2, and S3 may be allocated to share one register file. The register files will be discussed in more detail below.

In situations where execution units with high compute and throughput are used, e.g., dense math operations, wide data width register files, also referred to as accumulator register files, can be used and a process using accumulator register file renaming with dense math instructions can be performed. Accumulator register files and accumulator register file renaming processes are used so that data movement during execution is minimized to reduce power and improve execution throughput. Instructions in one or more embodiments are used to set-up and run the dense math execution unit, e.g., the inference engine and/or one or more MMA units, and the associated accumulator register file. General Matrix Rank Operation ("ger") instructions are one example of instructions that set-up and utilize a dense math execution unit, e.g., the inference engine and/or one or more MMA units, and in one or more aspects perform $n^2$ operations on $2n$ data. Accumulator instructions (e.g., "ger" instructions) usually have two VSR operand sources, an accumulator VSR destination, and an accumulator VSR source.

To enter wide data width (accumulator) register renaming mode, in an aspect, the wide data width (accumulator) registers are primed. After the wide data width (accumulator) registers are primed, the dense math execution unit, e.g., the matrix-multiply-accumulator (MMA) unit and/or inference engine, in one or more embodiments, can read and write the wide data width (accumulator) registers locally without needing to write the results back to the physical VS (main) register file. Preferably, the dense math execution unit accesses, reads, and or writes the same wide data width (accumulator) register file entry multiple times without writing results back to the physical main file register. When the dense math operations are completed, and/or in response to predetermined operations and instructions, in an embodiment, the result(s) in the wide data width (accumulator) register file entry can be written to the physical (main) register file entry and/or main memory.

The wide data width (accumulator) register(s) can reside in a vector-scalar (VS) execution unit, can be local to the vector-scalar execution unit, can reside in or be local to the MMA unit, and in one or more embodiments the wide data width (accumulator) register(s) may reside in or be local to the unit where the physical (main) register file(s) reside. In one or more embodiments, a process, processor architecture, and system is described using one or more wide data width (e.g., accumulator) registers in association with, local to, and/or located within one or more dense math execution units, e.g., one or more inference engines and/or MMA units, to handle dense math instructions. An inference engine in an embodiment can be a set of eight (8) matrix-multiply-accumulate (MMA) units, and thirty-two (32) 512-bit accumulator registers.

Figure 4:
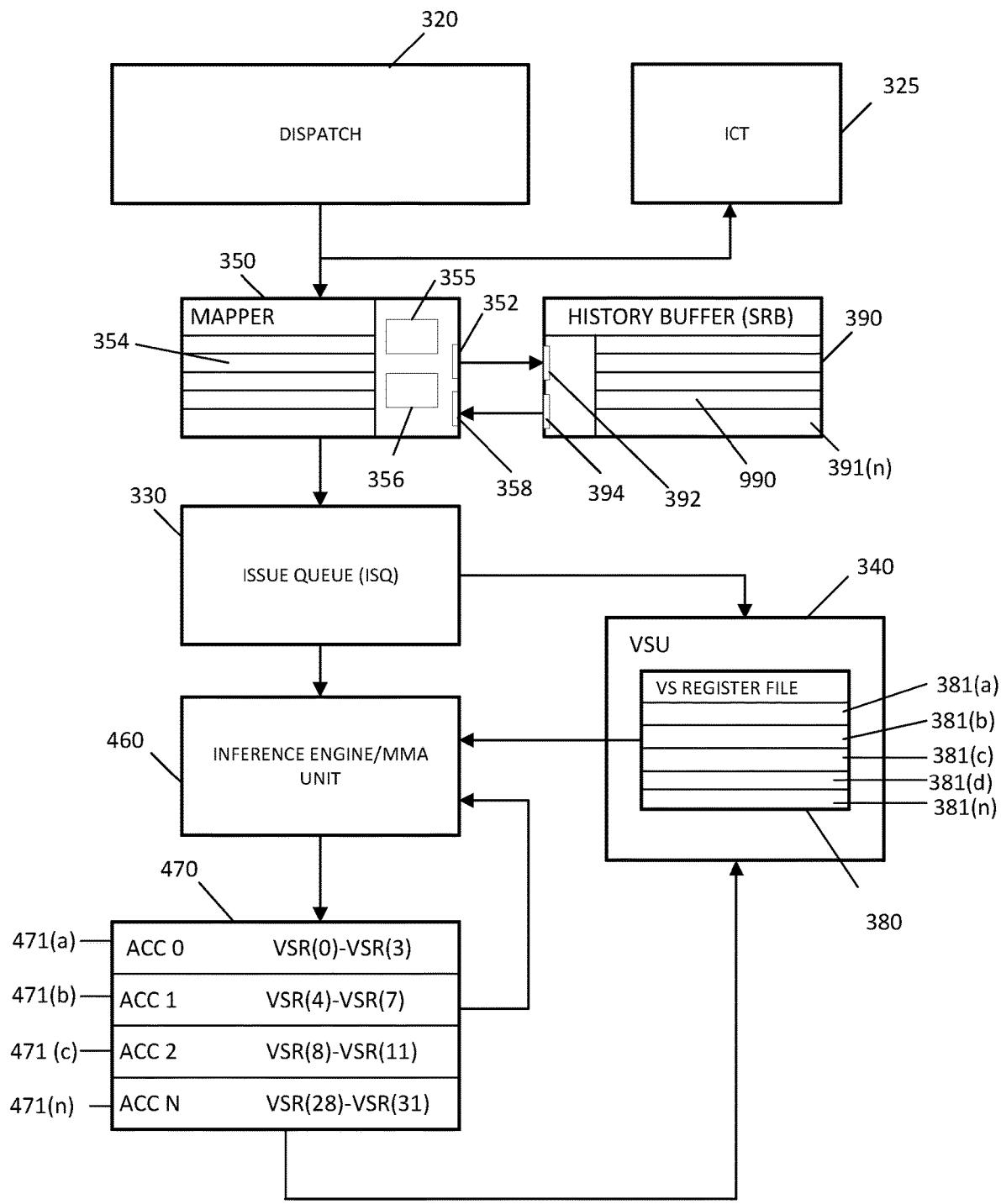
FIG. 4 illustrates a block diagram of a portion of a multi-slice processor having a wide data width (accumulator) register file according to an embodiment of the disclosure.

FIG. 4 shows a simplified block diagram of a processing pipeline utilizing a wide data width (accumulator) register file 470 in association with an execution unit, e.g., an inference engine/MMA unit 460, and a vector/scalar (VS) main register file 380 located within a vector scalar (VS) execution unit (VSU). The processing pipeline or execution slice includes a dispatch unit 320, an instruction complete table (ICT) 325, a logical register (LREG) mapper 350, a history buffer 390, an issue queue (ISQ) 330, VS execution unit (VSU) 340 having main physical register file 380 having a plurality of entries 381(a)-381(n), matrix multiply accumulator (MMA) unit 460, and wide data width accumulator register file 470 having a plurality of entries 471(a)-471(n). The main physical file register 380 in embodiments is also referred to as a Slice Target Register File (STF) or a VS register file. While the wide data width (accumulator) register file 470 is illustrated in FIG. 4 as being associated with and local to the inference engine/MMA unit 460, in one or more embodiments the wide data width (accumulator) register file 470 can reside within the MMA unit 460 and/or the VS execution unit 340.

Figure 5:
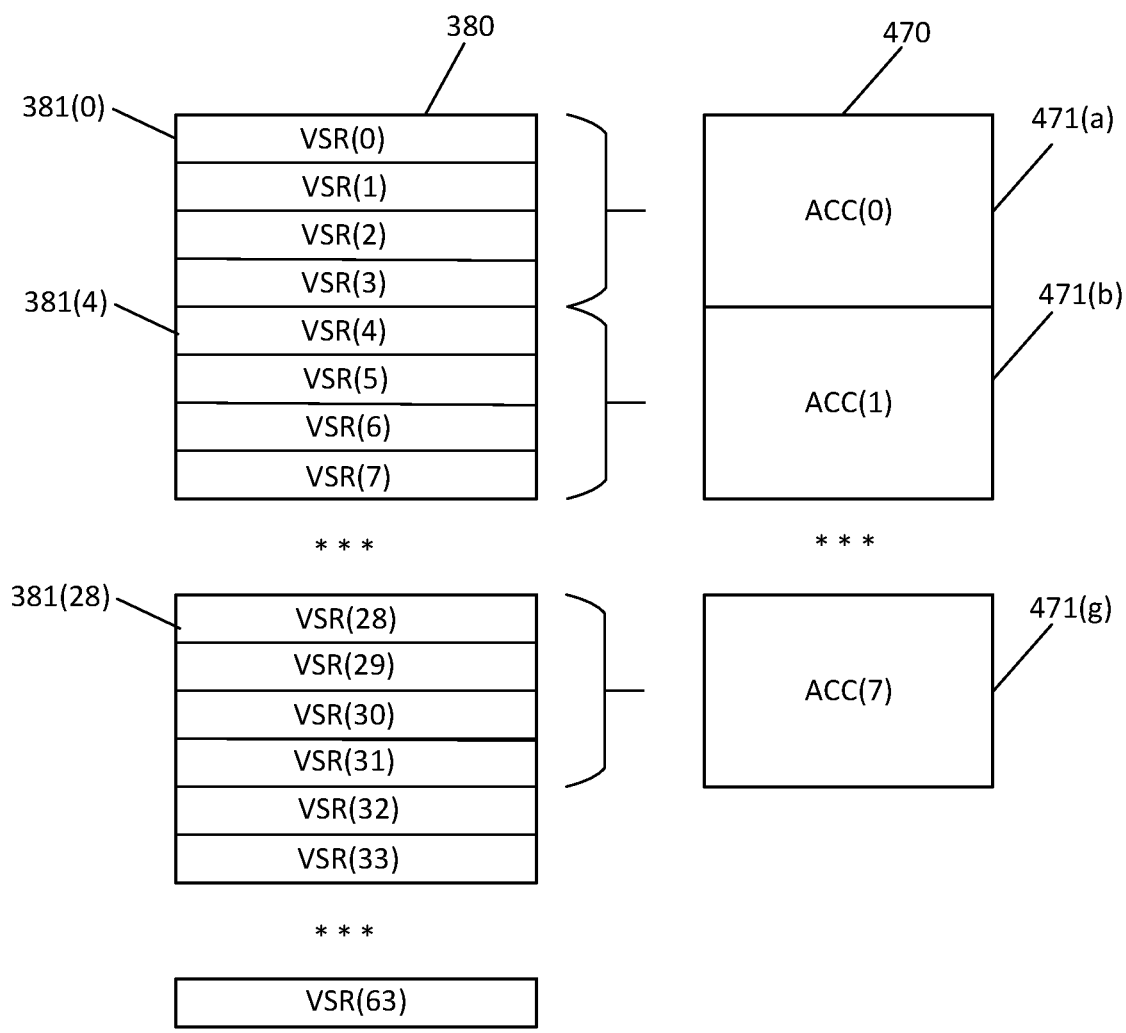
FIG. 5 illustrates a block diagram showing how main VS registers are grouped to wide data width accumulator register files in accordance with an embodiment of the disclosure.

In one or more embodiments, the data bit field width of the physical accumulator register file 470 is wider than the data bit field width of the main physical register file 380. In an embodiment, the wide data width (accumulator) register file 470 has a plurality of wide data width (accumulator) register file entries 471(a)-471(n). For example, in an embodiment, the accumulator register file 470 has 64 physical 512-bit register entries 471, while the main register file 380 is 128 bits wide. Each accumulator register file entry 471 in an embodiment holds a plurality of main register file entries, and in an embodiment holds a set of four consecutive main STF (VS) register file entries (381(x)-381(x+3)). In an example, four consecutive 128-bit main VS register file entries 381(a)-381(d) are mapped to a single 512-bit accumulator register file entry 471 (ACC(0)). In one or more embodiments, there are eight (8) logical accumulator registers (ACC0-ACC7) per thread. These eight (8) logical accumulator registers are mapped to thirty-two (32) physical registers. FIG. 5 illustrates an example of how the main registers 381 are grouped to the wide data width (accumulator) registers 471. It can be appreciated that a different number of main physical register file entries can be mapped to a single accumulator register file entry.

Traditionally MMA instructions use a wide data width dataflow, e.g., 512 bits, and map the data to a plurality of smaller data width register file entries (e.g., four 128-bit consecutive VS register file entries). Each rename update traditionally causes the prior mapping, e.g., all four of the VS register file entries, to be evicted from the logical register mapper 350 to the history buffer 390 to hold and restore if instructions are flushed. Evicting all these entries, e.g., all four of the VS register file entries, from the logical register mapper 350 and writing them to the history buffer 390 will require either: (a) a large number of logical register mapper read ports 352 and history buffer write ports 392; and/or (b) a large number of cycles to process resulting in processor latency. In addition, undergoing a flushing operation and restoring the logical register mapper 350 with entries from the history buffer 390 traditionally requires (a) a large number of history buffer read ports 394 and logical register mapper write ports 358; and/or (b) a large number of cycles to process resulting in processor latency.

A new mechanism/system/process is disclosed to permit processing of MMA instructions without increasing the number of read ports 352 (e.g., VSR target read ports) in the logical register mapper 350 or write ports 392 in the history buffer 390, and/or taking any additional cycles to perform. In addition, the new mechanism, system, and/or process permits flushing the history buffer 390 and restoring the logical register mapper 350 without increasing the number of write ports 358 in the logical register mapper 350 or read ports 394 in the history buffer 390, and/or taking any additional cycles to perform. For example, the new mechanism/system will permit renaming of 8 MMA instructions per cycle without the need to add more mapper read or write ports and/or history buffer write or read ports.

In one or more embodiments, for each MMA instruction that is dispatched, only the "primary" logical register (LReg), e.g., VSR(0), out of the plurality of VS register file entries, e.g., all four of the VS register file entries, is renamed in the logical mapper 350, and a wide data bit is set in the logical register mapper 350 indicating a wide dataflow instruction (e.g., MMA (ger) instruction). The wide data indicator bit is set in logical register mapper 350 so that any consuming instruction knows that the physical register mapped to the logical register (LReg) is a wide data bit register, e.g., 512-bit ACC register, instead of a smaller data width register, e.g., 128-bit STF (VS) register. For each MMA instruction dispatched, the logical register mapper 350 only needs to use one target read port 352 to read out the old logical register mapper entry 351(x) and only one history buffer write port 392 is needed per MMA instruction to store the evicted instruction (and evictor instruction information) in the history buffer 390. In this manner, only one "primary" logical register (LReg) entry out of the four logical register (LREG) entries needs to be renamed in the logical register mapper 350 for MMA instructions, while the other 3 logical registers (LRegs) updated by the same MMA instruction are not renamed, and do not have to be renamed since the other 3 logical registers cannot be updated by any other MMA instruction. In this manner, according to the disclosed embodiment, only the single "primary" VS logical register entries, e.g., VSR0, VSR4, VSR8, . . . , VSR28, are renamed in the logical register mapper 350 for MMA (ger) instructions.

In addition, in one or more embodiments, when an MMA (ger) instruction is flushed, the history buffer 390 only needs to restore the single "primary" logical register entry to the logical register mapper 350. As such, the history buffer 390 only needs one read port and the logical register mapper 350 only needs one write port to restore the single "primary" VSR logical register entry (e.g., VSR0) in the logical register mapper 350. The logical register mapper 350 and the history buffer 390 do not need any extra read or write ports to support MMA instructions, and each MMA (accumulator) instruction only consumes one logical register mapper entry 351(x) and one history buffer entry 391(x), rather than four entries if the normal renaming protocol were followed. If another MMA instruction is processed using the same wide data width (accumulator) file entry, then only the single "primary" VS logical register entry needs to be updated in the logical register mapper 350. If a younger non-MMA instruction needs to update any of these four VSR logical registers mapped to the wide data width (accumulator) register (that were updated by an MMA instruction), then the content of the four VSR logical registers will need to be moved back from the wide data width (accumulator) register 470 to the VS register file 380 before the non-MMA instruction can be dispatched and renamed.

Turning to an example implementation of wide data width (accumulator) register file use, to start dense math operations, e.g., MMA unit operations, in one or more embodiments, the processor, e.g., the decode unit, will decode and/or detect a dense math instruction, e.g., an inference engine and/or MMA unit "ger" instruction. The dispatch unit 320 in an embodiment will utilize one full dispatch lane to dispatch each dense math (ger) instruction with an iTag identifying the instruction. The dense math (ger) instruction (that utilizes the accumulator register file 470) is a single instruction and also takes one entry in the Instruction Complete Table (ICT) 325.

If an accumulator register instruction (MMA instruction) is dispatched, the accumulator register file entry 471 will need to be primed so that data in the accumulator register file entry 471 and the STF (VS) register file entries 381 are in sync. The accumulator register file entry 471 is primed when it is written to from memory, e.g., main register file 380 and/or main memory, or as a result of a priming instruction. For example, an instruction, e.g., xxmtacc, can move/copy data from the main (VS) register file 380 to the accumulator register file 470 in order to get the accumulator register file 470 and the main (VS) register file 380 in sync. In another example, an instruction, e.g., ldacc, can load and move data from main memory to the accumulator register file. In a further example, the accumulator register file is primed where the data in its entry is set to zero. Other instructions to prime the accumulator register file are contemplated.

Figure 6:
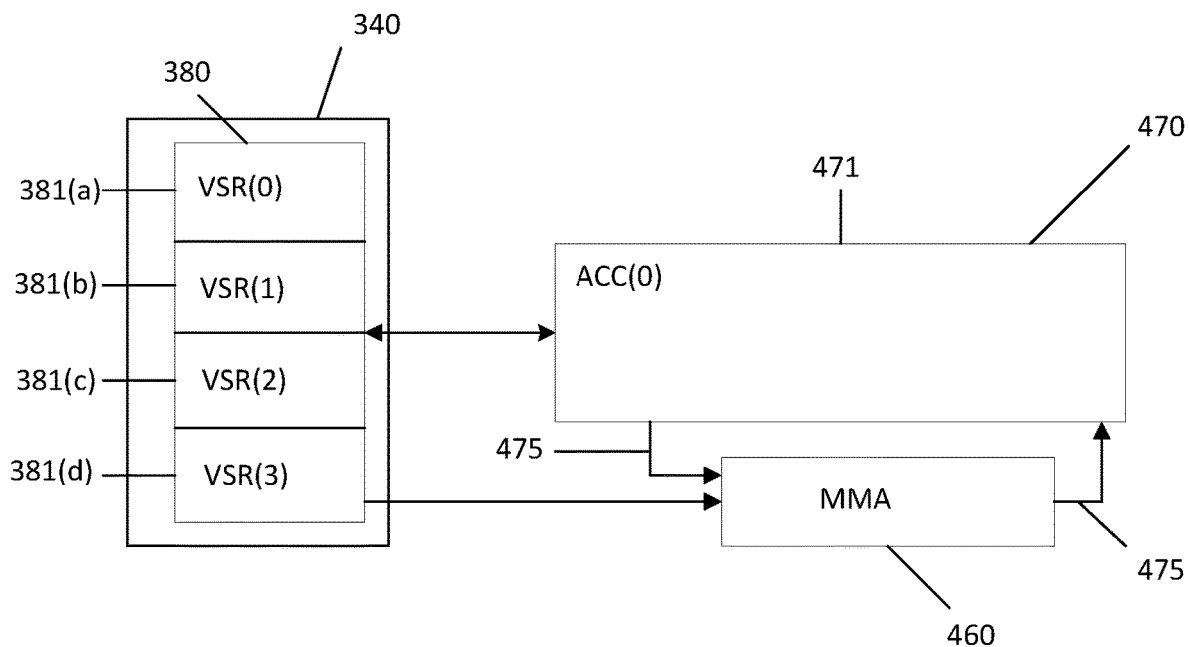
FIG. 6 illustrates simplified block diagram showing the set-up of an MMA unit, a wide bit width accumulator register file, and a physical VS register file in accordance with an embodiment of the disclosure.

In an embodiment, during priming the vector scalar (VS) execution unit (VSU) 340 will write main (VS) register data from the STF (VS) register file entries 381 and the iTag of the instruction that is doing the priming into the appropriate wide data width (accumulator) register file entry 471. During one example of priming, an available accumulator register file entry 471 (e.g., ACC(0)) is obtained from an accumulator free list 356 that maintains a count of and/or tracks allocated and free (e.g., available) accumulator register (ACC) tags, and the STF (VS) register data in the four entries 381(a)-381(d) of the STF (VS) register file 380 are written into the single accumulator register entry 471(x) (ACC(0)) as shown in FIG. 6. In an aspect, an accumulator register file busy flag is set to indicate that the accumulator register file entry 471 is currently active (e.g., the ACC register file entry is dirty). When all accumulator register file entries (471(0)-471(n)) are occupied (e.g., ACC Free List 356 shows no available ACC entries 471), dispatch unit 320 will stall in similar fashion to a main STF (VS) register resource stall, until an ACC register file entry 471 is available.

Figure 7:
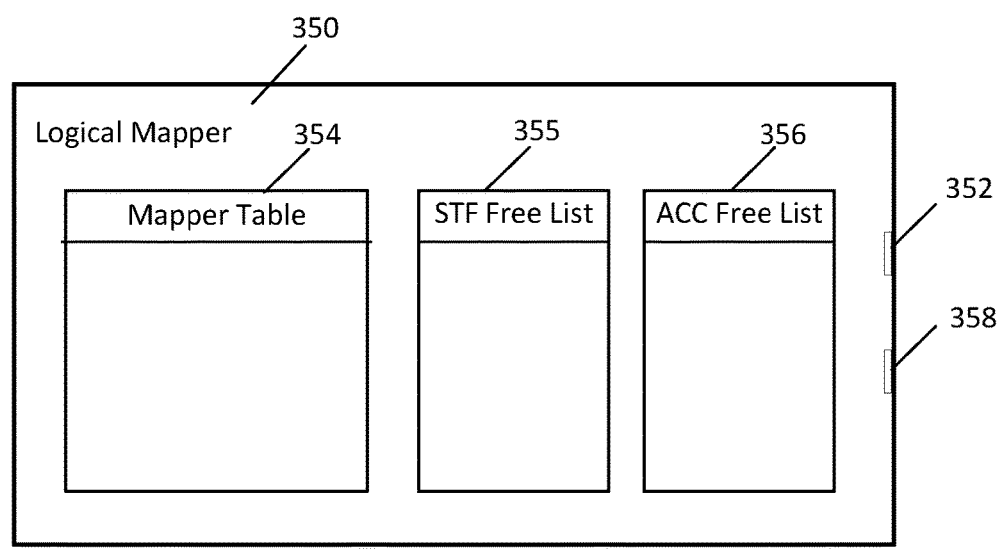
FIG. 7 illustrates a simplified block diagram of a logical register mapper in accordance with an embodiment of the disclosure.

FIG. 7 illustrates a block diagram of logical register mapper 350, which in an embodiment has Mapper Table 354, STF Free List 355, ACC Free List 356, one or more read ports 352, and one or more write ports 358. Mapper Table 354 tracks and maps logical registers (LRegs) to physical register file entries 381 where the data resides, and more specifically maps VS logical registers (VS LRegs) to physical VS (STF) register files entries 381. Read ports 352 permit data to be read from mapper 350 while write ports 358 permit data to be written to the mapper 350. The STF Free List 355 monitors and/or tracks STF register file entries (e.g., VS register file entries 381) that are available for use, while ACC Free List 356 monitors and/or tracks ACC register file entries 471 that are available for use.

FIG. 8 illustrates a simplified diagram of an embodiment of Mapper Table 354. Mapper Table 354 has a plurality of entries 351, and in the illustrated embodiment has 32 entries (rows) 351(0)-351(n) representing 32 VS logical register entries (VSR0-VSR31). Mapper Table 354 is indexed by logical register (LReg), e.g., VS LReg (VSR0-VSR31), and each entry 351 has a number of fields 353 represented as columns. Valid field 861 indicates that the instruction (iTag) corresponding to the entry is valid, which means that the instruction has not yet completed (i.e., it is still speculative and could be flushed). Any entry 351 with valid field 861 set to "1" indicates that the entry is also in the history buffer 390 with the "prior" mapping. ITAG field 862 is the unique tag for the instruction, STF/ACCTag field 863 is the pointer to the physical register file entry that is holding the data, and the PROD field 865 identifies the execution unit that is producing the result. The 128b field 866 indicates the vector result is 128 bits, and 512b field 867 indicates the vector result is 512 bits and is in the ACC register file 470. When the 512b field 867 is set it means the STF/ACC Tag field 863 refers to an ACCTag and points to an accumulator file entry 471. When ready field 868 is marked "1" the instruction is executed and written back to the appropriate main register file 380 or wide data (accumulator) register file 470 as indicated by 128b field 866 and 512b field 867.

Priming the accumulator register file entry 471 also allocates the accumulator register rename. The prime instruction will copy the VS register files, e.g., VSR0, VSR1, VSR2, and VSR3, into the accumulator register file, e.g., ACC0, according to the grouping shown in FIG. 5. The accumulator register file, e.g., ACC0, reads the four STFtags and writes one ACCtag. Each accumulator register (ACC) target is renamed and mapped to an accumulator register file entry with an ACCtag. The ACCtag identifies and/or points to a physical accumulator register file entry 471. Each MMA (ger) instruction writes a single ACC register file entry (e.g., ACC(x)). For each MMA (ger) instruction that is dispatched, only the "primary" VS logical register entry (e.g., VSR0) out of the group of four VS logical register entries (e.g., VSR0-VSR3) is renamed in the logical register mapper 350, and a 512b indicator (e.g., 512b field 867) is set.

When the ACC register file entry 471 is primed, the 512b field 867 is marked in the Mapper Table 354 indicating that the VS register entry is mapped to the accumulator register file entry, and that the Tag field 863 is an ACCtag and not an STFtag. Marking the 512b field 867 in the Mapper Table 354 indicates to any consuming instruction that the tag mapped to the logical register is a wide data width (e.g., 512-bit) register rather than a smaller data width (e.g., 128-bit) register, and identifies from which Free List (e.g., STF Free list 355 or ACC Free List 356) to obtain the tag. In one or more embodiments, only the "primary" VS logical register has the bit set in the 512b field 867. The VS logical registers other than the "primary" VS logical register do not have the 512b field 867 marked. In an example, only VSR0, VSR4, VSR8, . . . , VSR28, are the "primary" VS logical registers and have the 512b field 867 marked to indicate an accumulator register file is in use.

FIG. 9 illustrates a simplified diagram of an embodiment of History Buffer Table 990 in History Buffer 390, also known as a Save & Restore (SRB) buffer, having a plurality of entries 391 (e.g., entries 0-63) represented as rows. History Buffer Table 990 has a number of fields 993 (represented as columns) and two mappings per entry 391—the evictor (younger) instruction and the evictee (older) instruction. The Mapper Table 354 is indexed by logical register (LReg), while the History Buffer Table 990 (History Buffer 390) has a logical register (LReg) field 991, and entry 391(x) is written into the "first" available entry 391(x) in the History Buffer Table 990. The fields 993 in the History Buffer Table 990 closely correspond and/or correlate to the fields 353 in the Mapper Table 354. The Valid ("V") fields 992, 994 in the History Buffer Table 990 indicate that the instruction (iTag) is still speculative. The evictee (older) instruction fields have the ready ("rdy") bit field 995 and the PROD field 996 to check for writebacks. The History Buffer 390 also has a 512b field in the History Buffer Table 990 to know if the tags are STF (VS) tags or ACC tags so the tags are released to the correct free list (STF Free List 355 or ACC Free List 356) when the instruction is flushed or completed. The evictor (younger) instruction fields include the iTag, STFtag (ACCtag), and the bit size fields (in case the entry is flushed and the tag is released).

Each *ger instruction writes a single accumulator register file entry. The results in dense math operations, e.g., the accumulator register file, are not read and written to the main (VS) register file each cycle. Instead, large data results stay local to the dense math engine, e.g., MMA unit, through use of the accumulator register file 470. That is, MMA unit operations are written back to the accumulator register file 470. During inference engine and/or MMA operations, in one or more embodiments, the accumulator register file 470 is utilized as a source and a target (accumulator). In an aspect, the same accumulator register file entry 471 is written to multiple times. That is, in an aspect, as the MMA operates it uses operands from the accumulator register file entry 471(x) and writes results back to the same accumulator register file entry 471(x). The loop 475 in FIG. 6 illustrates the operations of the MMA unit rewriting the same target entry 471 (ACC(0)) in the accumulator register 470. In this manner, the VS or main register file 380, during inference engine or MMA operations, does not undergo renaming operations.

Each subsequent MMA unit instruction writes a single accumulator register file entry 471 and sets the state of the target accumulator register entry to dirty, indicating that the accumulator register file entry 471 and the corresponding main (VS) register file entries (381(a)-381(d)) are not in sync. For MMA unit instructions, the accumulator register file 470 stores the result, and the main (VS) register file 380 does not store the result. While data will not be written back to the main register file 380 in the main execution unit, e.g., the VSU 340, the accumulator register file iTag is updated when it receives a new instruction from the issue queue 330.

During MMA operations, an ACC tag is allocated in the logical register mapper 350 to the "primary" VSR LREG entry, e.g., VSR0, VSR4, VSR8, . . . , VSR28, while the other VSR LREGs, e.g., the other 3 VSR LREGs, in the logical register mapper 350 remain untouched. During operations, only one entry 351 in the logical register mapper 350, e.g., one entry in Mapper Table 354, is evicted in response to each MMA instruction, where in an embodiment only the "primary" (VSR) LREG is evicted and stored in the history buffer 390. For ACC0, only VSR0 is evicted to the history buffer 390 (e.g., history buffer table 990); for ACC1, only VSR4 is evicted to the history buffer 390; for ACC2, only VSR8 is evicted to the history buffer 390; etc. It can be appreciated that other STF (VS) register files can be designated as the "primary" STF (VS) register files.

For an instruction that utilizes an accumulator register file entry, the iTag of the younger instruction utilizing the accumulator register file will replace the older iTag, but the main (VS) register file tag (STFtag) will not change. Even though a plurality of VS register entries, e.g., four VS register entries, are mapped to the accumulator register entry, every read or write operation will point to the "primary" VS register entry (e.g., VSR0, VSR4, VSR8, . . . ) in the logical register mapping. So for example, when an MMA instruction says to read ACC(0), perform an operation, and write the result back to ACC(0), the MMA instruction has a logical register (LREG) that is decoded to ACC(0), which the logical register mapper hardware interprets ACC(0) as VSR0. The logical register mapper in the example implementation interprets ACC(1) as VSR4, ACC(2) as VSR8, . . . , ACC(7) as VSR28. In that manner, the logical register mapper 350 is only handling one logical register entry out of four logical register entries when handling wide data width (MMA) instructions.

In FIG. 8, for entry 351(0) (VSR0) in the mapper table 354, the valid field 861 is set to "1" indicating that the instruction is valid (has not been completed) and the 512b field 867 is set to "1" indicating an accumulator register entry 471 (ACC0), while entries 351(1)-351(3) (VSR1-VSR3 have valid field 861 set to "0" as these instructions are not valid. In VSR4-VSR7 the valid field 861 is set to "1" indicating that these instructions are valid, and the 512b field 867 is set to "0" so VSR4-VSR7 are not wide bit data entries/instructions. In an embodiment, only VS logical registers VSR0, VSR4, VSR8, ..., VSR8 can have the 512b field 867 set to 1, which indicates a mapping to an accumulator register corresponding to ACC0, ACC1, ACC2, ..., ACC7. That is, when the 512b field 867 is set to 1 in entries VSR0, VSR4, VSR8, ..., VSR28, the logical register is mapped to respective accumulator register entries ACC0, ACC1, ACC2, ..., ACC7.

In the History Buffer Table 990 of FIG. 9, the VS logical register VSR0 (ACC0) has two entries, 390(0) and 390(2). Instruction (iTag) 0x00B (evictor (younger) instruction in entry 390(2) and evictee (older) instruction in entry 390(0)) was 512 bits and evicted (older) instruction (iTag) 0x001 in entry 391(2) was 128 bits. Instruction (iTag) 0x010 is the evictor (younger) instruction in entry 391(0) of the History Buffer Table 890 that evicted instruction (iTag) 0x00B. The other entries (390(1), 390(3), 390(4), and 390(5)) in the History Buffer Table 990 point to and/or reference VS register entries (128 bits and 64 bits) that are still speculative.

By renaming only one of the four VS logical registers, the logical register mapper 350 only needs to use one target read port to read out (evict) one VS logical register (e.g., one entry 351 in the logical register mapper 350 (Mapper Table 354)) and store it in the History Buffer 390 (History Buffer Table 990), and only needs one write port to write one of the VS logical register (LReg) entries 351, e.g., the "primary" VS logical register mapper entry, in the logical register mapper 350 (the Mapper Table 354). The History Buffer 390 (e.g., History Buffer Table 990) likewise only needs one write port to write the single "primary" entry 351 (e.g., VSR0) evicted from the logical register mapper 350 (e.g., Mapper Table 354). The other VS logical registers, e.g., the other 3 VS logical registers (VSR1, VSR2, and VSR3), are not renamed since they cannot be updated by any other MMA instructions. In addition, by only renaming the one primary VS logical register (LReg) out of the plurality, e.g., four, VS logical registers in the logical register mapper 350, the History Buffer 390, when an MMA (ger) instruction is flushed, needs only one read port to restore the one "primary" VS logical register (LReg) entry to the logical register mapper 350, and the logical register mapper 350 needs only one write port to restore the primary VS logical register entry in the Mapper Table 354.

In an example embodiment, when an MMA (ger) instruction is dispatched and reads the logical register mapper 350, the logical register mapper 350 in an aspect ignores the final 2 bits of the source logical register (LReg), ensuring that the mapping decodes to every fourth VS register entry 351. While in the example embodiment shown in the figures, the first VS logical register entry, e.g., VSR0, VSR4, VSR8, etc., for each accumulator register file entry has been selected as the "primary" VS logical register, it can be appreciated that VS logical registers other than the "first" VSR logical register can be selected as the "primary" VS logical register, e.g., VSR1, VSR5, VSR9, etc.

Dense math instructions dispatched from the dispatch unit 320 in an embodiment will use one full issue queue (ISQ) entry in issue queue 330. In one or more embodiments, dense math instructions that utilize the accumulator register file 470 issue from the issue queue 330 in order, preferably by register number, and in an aspect by instruction type. The instructions utilizing the accumulator register file 470 preferably issue in order and back-to-back. If there are older instructions that utilize the accumulator register file 470, the issue queue 330 can issue the older instruction since the older instruction may read or write the main (VS) register file 380, and the accumulator register file 470 will update only the accumulator register file 470 until the data in the accumulator register file 470 is written back to the main (VS) register file 380.

The accumulator register file entry 471 is de-primed and its data written back to the main (VS) register file 380 in response to a number of scenarios. In an embodiment, the accumulator register file entry 471 is written back and/or de-primed in response to instructions, and/or where the main (VS) register file 380 is sourced after the accumulator register 470 is dirty. For example, in response to a move from accumulator register to main (VS) register file instruction, e.g., xxmfacc, the accumulator register file is de-primed and results in the accumulator register file entry 471 are moved from the accumulator register file entry 471 and written back to the main (VS) register file entries 381. In another example, in response to a move from the accumulator register file and store instruction, e.g., stxacc, the accumulator register file entry 471 is de-primed and the results in the accumulator register file entry are written back to main memory. In one or more embodiments, when an accumulator register file entry 471 is dirty and is accessed by the main (VS) register file 380, the hardware will de-prime the accumulator register file entry 471. In an embodiment, the hardware will run a sequence that writes all accumulator registers back to the main (VS) register files. In an aspect, each accumulator register file entry 471 will be de-primed, the data in the accumulator register file entry 471 will be written into the main VS register file entries 381, and the accumulator register file entry 471 will also be deallocated from the rename pool (e.g., added to the ACC Free List 356).

In response to a younger main execution unit instruction, e.g., a VSU instruction, touching a main register file entry 381 that is mapped to an active accumulator register file entry 471, the issue queue 330 in an embodiment is signaled to start the write back of the affected accumulator register file entry 471. The accumulator register file 470 writes data back to the corresponding main register file entries 381. The main execution unit, e.g., the VSU, will finish the write back when the last part of the accumulator register file data is written back. The "ACC busy" flag will be reset (cleared) when the write back is complete. The iTag of the competed instruction is broadcast to the history buffer 390 to deallocate the main register file entries (STF tags) 381. The processor will then process the younger non-dense math instructions including reading data from the main register file. In addition, after the accumulator register file is drained, and the ACC busy flag is cleared, the issue queue 330 can resume issuing instructions, and the dispatch unit 320 can resume dispatching instructions.

Figure 10:
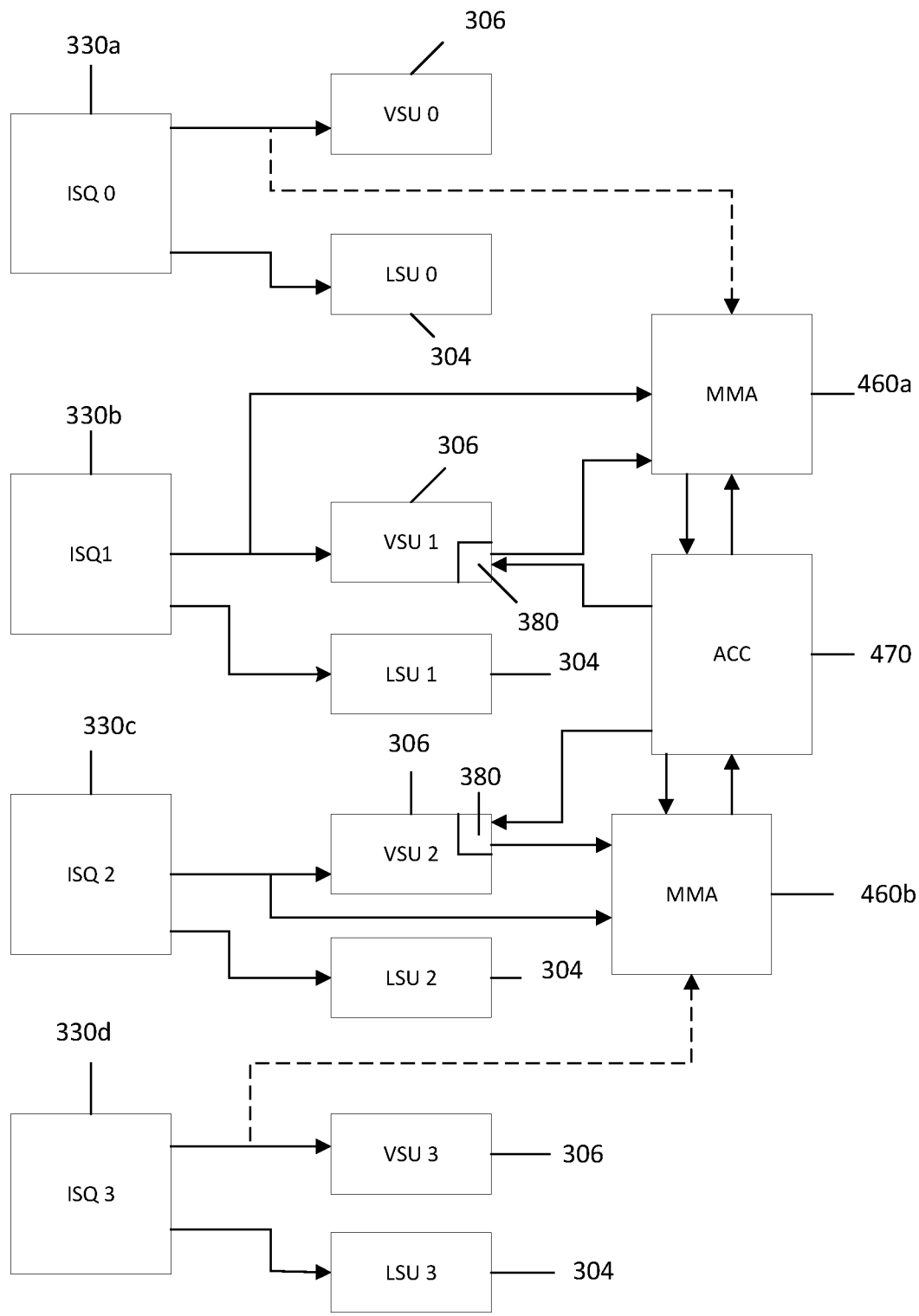
FIG. 10 illustrates a simplified block diagram of two super slices of a processor having MMA units and wide data width (accumulator) register files.

FIG. 10 shows another embodiment of a processor having one or more dense math execution units, e.g., matrix-multiply-accumulator (MMA) units, in association with a local wide data (accumulator) register file where the processor is configured so that the operations of the one or more dense math units write results back multiple times to the same wide data (accumulator) register file entry. FIG. 10 shows two super slices of a processor for handling data. Each super slice includes at least one MMA unit 460, two vector scalar (VS) execution units 306 and two load store (LS) units 304. A single wide data (accumulator) register file 470 is used in connection with both the MMA units 460. In an alternative embodiment, each execution slice could have its own MMA unit with a local wide data (accumulator) register file, and in a further aspect, each MMA unit has the accumulator register file contained within the MMA unit in each execution slice. In the embodiment of FIG. 9, issue queue (ISQ) 1 330*b* in super slice 0 and issue queue (ISQ) 2 330*c* in super slice 1 issue instructions, e.g., "ger" instructions, to the respective MMA units (460*a* and 460*b*). Alternatively, as shown by dotted lines in FIG. 10, issue queue (ISQ) 0 330*a* and issue queue (ISQ) 3 330*d* could issue instructions, e.g., "ger" instructions, to each MMA unit (460*a* and 460*b*) in the respective super slice. Other configurations for wide data bit width (accumulator) register files, and in an aspect, dense math execution units, e.g., MMA units, are contemplated.

Figure 11:
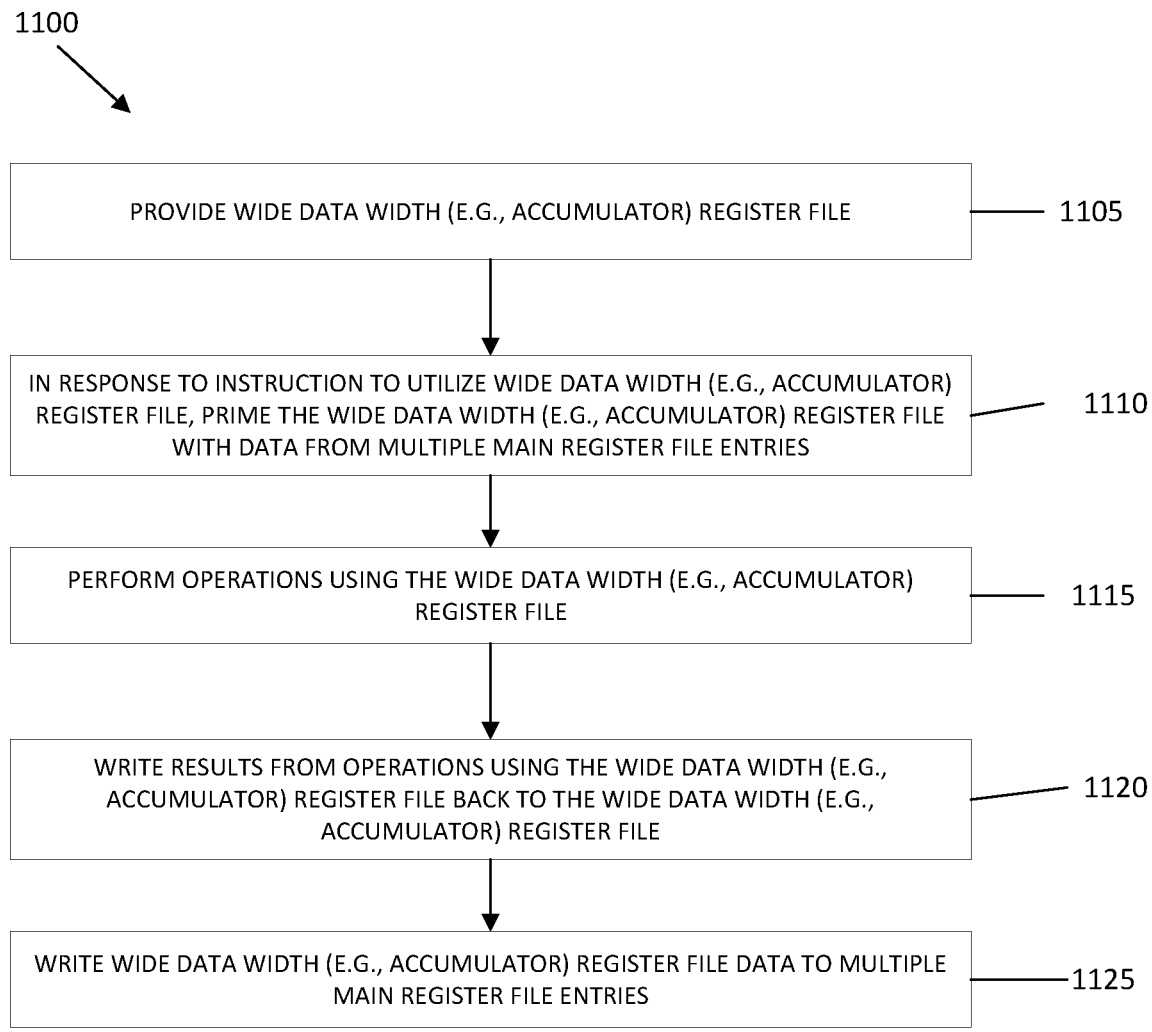
FIG. 11 illustrates a flow chart of a method according to an embodiment for processing wide width data in a processor.

FIG. 11 is an exemplary flowchart in accordance with an embodiment illustrating and describing a method of handling data, e.g., executing instructions, in a processor, including in an embodiment, processing and handling wide bit width data in association with wide data (accumulator) register files, for example, including in an embodiment handling dense math instructions, e.g., MMA ("ger") instructions, in a processor. While the method 1100 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 11, but the process may be integrated and/or one or more steps may be performed together, simultaneously, or the steps may be performed in the order disclosed or in an alternate order.

The method 1100 in FIG. 11 relates to processing data in a processor, more specifically to handling wide width data in register files, for example, accumulator register files, in association with smaller data width main register files, and according to an aspect processing dense math instructions by use of a dense math execution unit, for example, an MMA execution unit, in association with a register file having a wider data bit width than the main register files. At 1105, a wide data width register file, e.g., an accumulator register file, is provided. In an example, a dense math execution unit, for example, a matrix-multiply-accumulation (MMA) unit, is provided in association with the wide bit-width (accumulator) register file. In one or more examples, a dense math execution unit may be multiple MMA units arranged as an inference engine. Other dense math execution units are contemplated. In an embodiment, the accumulator register file is local to one or more of the dense math execution units, and in an aspect the accumulator register file resides in an MMA unit. Preferably, the accumulator register file has a data bit field width that is wider than the data bit field width of the main register file in the processor. The accumulator register file in an embodiment has a data field that is 512 bits wide while the data field in the main register file in the processor is 128 bits wide. According to an aspect, more than one main register file entry is mapped to a wide data width (accumulator) register file. For example, four consecutive main register files are mapped to one wide data width (accumulator) register file.

In one or more embodiments, at 1110, in response to an instruction to use the wide data width (accumulator) register file, for example, for dense math execution unit operations, the wide data width (accumulator) register is primed. For example, where the accumulator register file is a source for the dense math execution unit operations, the accumulator register file is primed. Priming the accumulator register file, in an embodiment, includes synchronizing the data in the accumulator register file with data that resides in the main register file, e.g., the STF (VS) register file, or data that resides in main memory. Priming the accumulator register file can also include clearing the data in the accumulator register file, e.g., setting the data in the accumulator register file entry to zero. In one or more embodiments, the accumulator register file is primed when it is first written from the main register file, from main memory, or as a result of a self-priming instruction (where the data in the accumulator register file entry is set to zero). In one or more embodiments, the accumulator register file allocates an accumulator register file rename, the accumulator file is primed, and the value of the data in the accumulator register file is set to the value in multiple main register file entries, e.g., four main STF (VS) register file entries.

Operations are performed using the wide data width register file, e.g., the accumulator register file, at 1115, using for example an MMA and/or inference engine and undergoing dense math operations. That is, dense math operations are performed using the wide data width (accumulator) register file, and in an aspect the inference engine and/or MMA unit(s). The results from operations using the wide data width register file, e.g., the accumulator register file, in an embodiment, at 1120 are written back to the wide data width (accumulator) register file. That is, the wide data width (accumulator) register file is used as both a source and a target for example during dense math execution unit operations. The results of the dense math execution unit preferably are written back to the same target wide data width (accumulator) register file. That is, in an embodiment, a single wide data width (accumulator) register file target can be re-written multiple times. In one or more aspects, there is no write back to the main STF (VS) register file, and instead the wide data width (accumulator) register that is local to the dense math execution unit, e.g., the MMA unit, stores the result while the main register file does not store the result. In this manner, the dense math execution unit, e.g., the inference engine and/or MMA unit, operates without renaming main STF (VS) register file entries. In an embodiment, in response to writing results back to the wide data width (accumulator) register, the wide data width (accumulator) register file entry is flagged or marked, e.g., marked dirty.

At 1125, the wide data width (e.g., accumulator) register file results in one or more embodiments are written back to the multiple main register file entries and/or main memory. In an embodiment, when the dense math execution unit operations are complete, the results of the wide data width (accumulator) register file are written back to the multiple main register file entries, and/or to main memory. In an embodiment, the wide data width (accumulator) register is deprimed, the value in the wide data width (accumulator) register file is written into multiple corresponding main register file entries (or main memory), and the wide data width (accumulator) register file entry is deallocated. In accordance with an embodiment, the main register file is written back in response to instructions and/or when the main register file entry mapped to the wide data width (accumulator) register file entry is sourced or targeted and the wide data width (accumulator) register file entry is dirty.

Figure 12A:
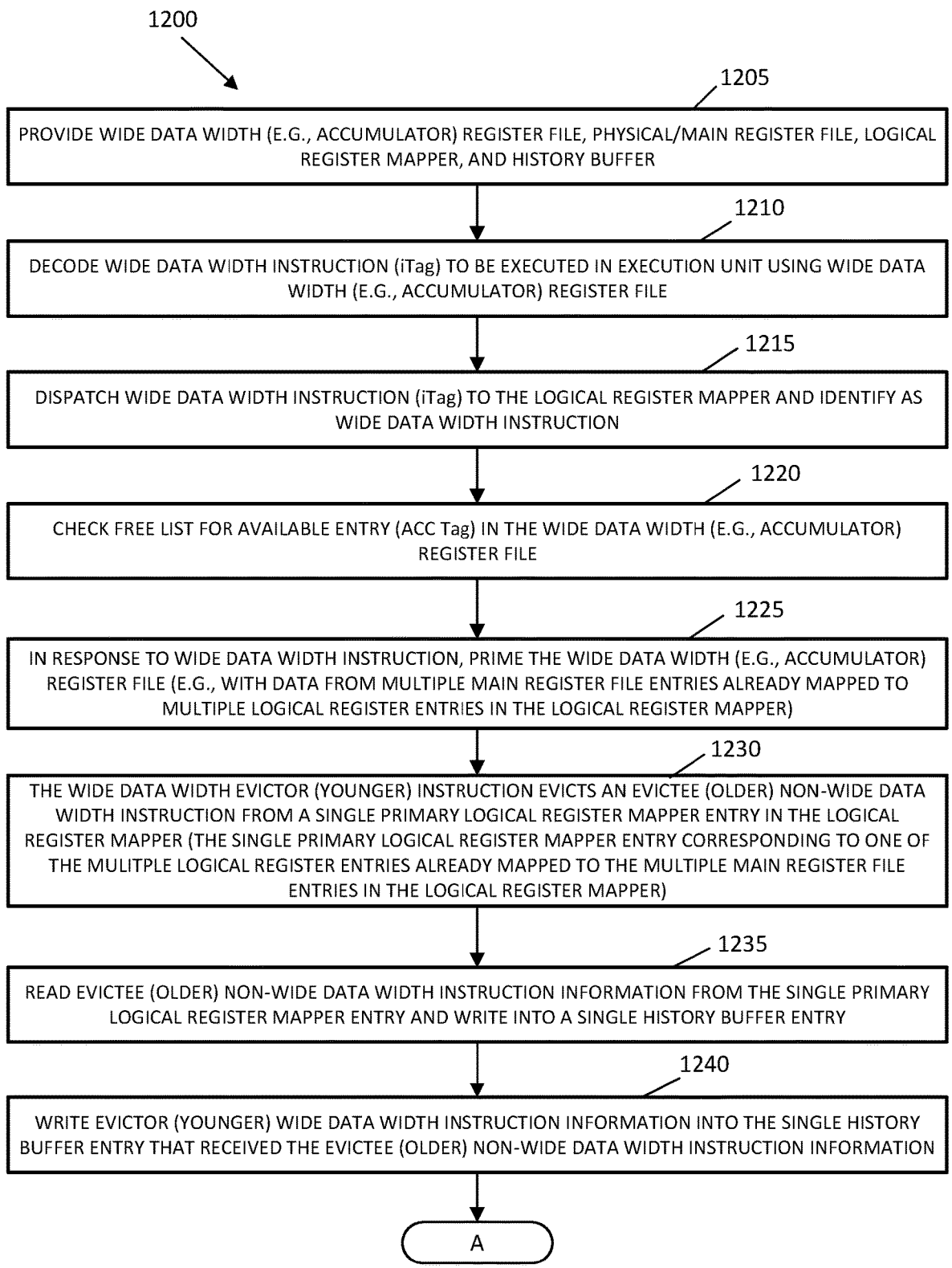
FIG. 12A & FIG. 12B illustrate a flow chart of a method according to an embodiment for processing wide width data in a processor.
Figure 12B:
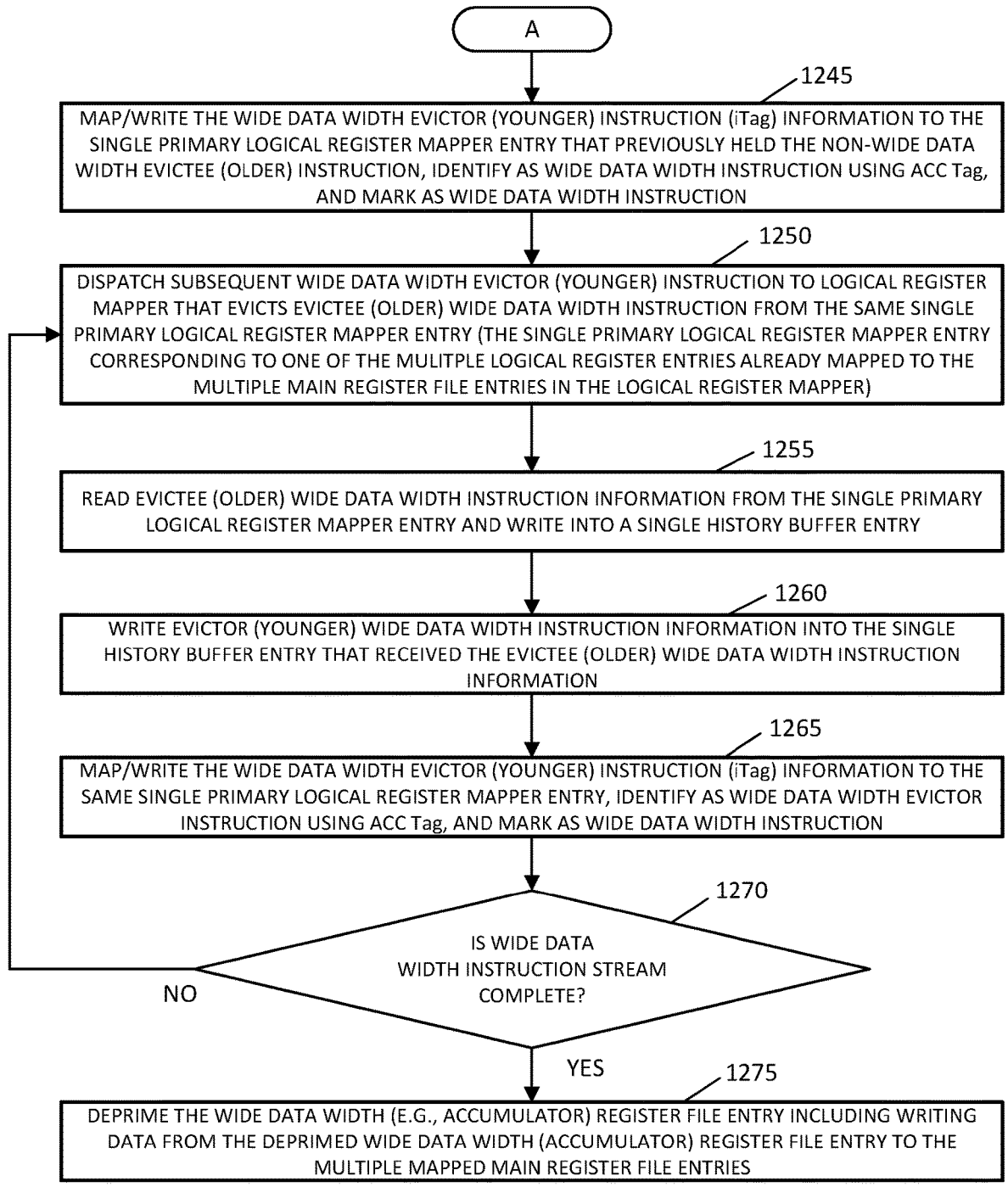

FIG. 12 is an exemplary flowchart in accordance with an embodiment illustrating and describing a method of handling data, e.g., executing instructions, in a processor, including in an embodiment, processing and handling wide data width instructions, e.g., MMA ("ger") instructions, that utilize a wide data width register file, e.g., an accumulator register file, that maps to multiple main register file entries (e.g., STF (VS) register file entries) in a processor. Process 1200 in FIG. 12 in an aspect is more particularly directed to operations in a logical register mapper and history buffer in a processor executing wide data width that uses a wide data width register mapped to multiple smaller data width main register files. While the method 1200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 12, but the process may be integrated and/or one or more steps may be performed together, simultaneously, or the steps may be performed in the order disclosed or in an alternate order.

At 1205, according to one or more embodiments, a wide data width register file (e.g., an accumulator register file), a main physical register file (e.g., a STF (VS) register file), a logical register mapper, and a history buffer are provided. In one or more embodiments, a processor having a pipeline which contains a wide data width register file (e.g., an accumulator register file), a main physical register file (e.g., a STF (VS) register file), a logical register mapper, and a history buffer are provided. In one or more embodiments, the wide data width register file is an accumulator register file that has a plurality of entries, and each entry can hold data having a wider width than the plurality of entries in the main physical register file. In an embodiment, the wide data width register file can store data that is 512 bits while the main physical register file can store data that is 128 bits, and in an aspect four main register files, preferably four consecutive main register files, are grouped to one wide data width register file.

At 1210, a wide data width instruction (iTag) to be executed in an execution unit using a wide data register file, e.g., an accumulator register file, is decoded. At 1215 the decoded wide data width instruction (iTag) is dispatched to the logical register mapper and identified as a wide data width instruction. The wide data width free list (e.g., the ACC Free List 356), preferably located in the logical register mapper, is checked at 1220 for an available entry in the wide data width register file, e.g., for an ACC Tag. The wide data width register file is primed at 1225 in response to the wide data width instruction. In one or more embodiments, data from multiple main register file entries at 1225 are written into the available wide data width register file (e.g., corresponding to the ACC tag obtained from the wide data width free list (e.g., ACC Free list 356)). For example, data from VSR(0) through VSR(3) are written into a single wide data width register entry, e.g., ACC0.

At 1230 the wide data width instruction, referred to as an evictor (younger) instruction, evicts a non-wide data instruction, e.g., the evictee (older) instruction from a single "primary" entry in the logical register mapper, preferably through a single read port. The single primary entry in the logical register mapper in an aspect corresponds to one of the multiple main registers that were mapped to the accumulator register. For example, primary logical register entry VSR(0) is evicted from the logical register mapper, but not logical registers VSR(1)-VSR(3). More specifically at 1235, information on the non-wide data width instruction, e.g., evictee (older) instruction information, is read from a single primary entry in the logical register mapper, e.g., through a single read port, and is written into a single history buffer entry, e.g. through a single write port. At 1240, wide data width instruction information, e.g., evictor (younger) instruction information, is written into the single history buffer entry that received the non-wide data width instruction information, e.g., the evictee (older) instruction information, through a single history buffer write port.

In one or more embodiments, at 1245, the wide data width instruction information, e.g., evictor (younger) instruction information, is written (mapped) to the single primary logical register entry that previously held the non-wide data width instruction, e.g., the evictee (older) instruction, and the entry is identified as a wide data bit width instruction using the ACC tag (written into the STF/ACC Tag field) and marking the wide data width indicator bit field. For example, the MMA instruction information is written through a single write port into the single logical register mapper entry previously occupied by VSR(0). In addition, the ACC tag received from the ACC Free List 356 is written into the STF/ACCTag field 863, and the 512b field 867 is set (marked with a "1"), in the logical register mapper 350, e.g., Mapper Table 354.

In response to a further, subsequent wide data width instruction being decoded that addresses the previously primed wide data width register (e.g., accumulator register file ACC0), the subsequent wide data width instruction, e.g., a subsequent evictor (younger) instruction, is dispatched at 1250 to the logical register mapper and evicts the previous wide data width instruction, e.g., the evictee (older) instruction, from the same single primary logical register mapper entry, preferably through a single read port. That is, the wide data width instruction in VSR(0) is evicted from the logical register mapper while VSR(1)-VSR(3) entries remain in the logical register mapper. More specifically, information on the earlier wide data width instruction, e.g., evictee (older) instruction information, is read at 1255 from the single primary logical register mapper, e.g., through a single read port, and written into a single history buffer entry, e.g., through a single write port. For example, at 1255 information from VSR(0) is read from a single read port in the logical register mapper and transmitted to the history buffer through a single history buffer write port to a single history buffer entry. At 1260 subsequent wide data width instruction information, e.g., evictor (younger) instruction information, is written through a single write port into the single history buffer entry that received the earlier wide data width instruction information, e.g. evictee (older) instruction information.

Information from the subsequent wide data width instruction, the subsequent evictor (younger) instruction information, is mapped (written) at 1265 to the same single primary logical register entry in the logical register mapper that held the earlier wide data width instruction, e.g., the evictee (older) instruction, through a single read port. The entry written into the single primary logical register entry at 1265 also is identified as a wide data bit width instruction using the ACC tag (written into the STF/ACC Tag field) and marking the wide data width indicator bit field. For example, the subsequent MMA instruction information is written through a single write port into the single logical register mapper entry previously occupied by VSR(0), the ACC tag in the STF/ACCTag field 863 remains the same since the same wide data width register file entry ACC0 is being utilized, and the 512b field 867 remains set (marked with a "1").

The process 1200 continues to 1270 where if another wide data width instruction, e.g., MMA instruction touching the same wide data width register file entry, is decoded (1270: No), then process 1200 continues to 1250, where 1250,

1255, 1260, and 1265 are performed. That is, at 1270 it is determined whether the wide data width instruction stream, e.g., the MMA operation using the accumulator register file, is complete, and if the process is not complete (1270: No), then the process 1200 continues to 1250. Process steps 1250, 1255, 1260, 1265, and 1270 are performed, until a non-wide data width instruction, e.g., a non-MMA instruction, is detected (1270: Yes), and the process 1270 continues to 1275. The wide data width register file entry, e.g., the accumulator file entry, is deprimed at 1275 and the data from the wide data width register file entry is written into the multiple main register file entries mapped to the wide data wide register file entry, e.g. the accumulator register file. For example, at 1275, the accumulator register ACC0 is deprimed, and the data in the accumulator register file entry ACC0 is written into the four main register file entries VSR(0)-VSR(3) mapped to the accumulator register file entry ACC0 (and the ACCtag corresponding to ACC0 is returned to the ACC Free List).

Figure 13:
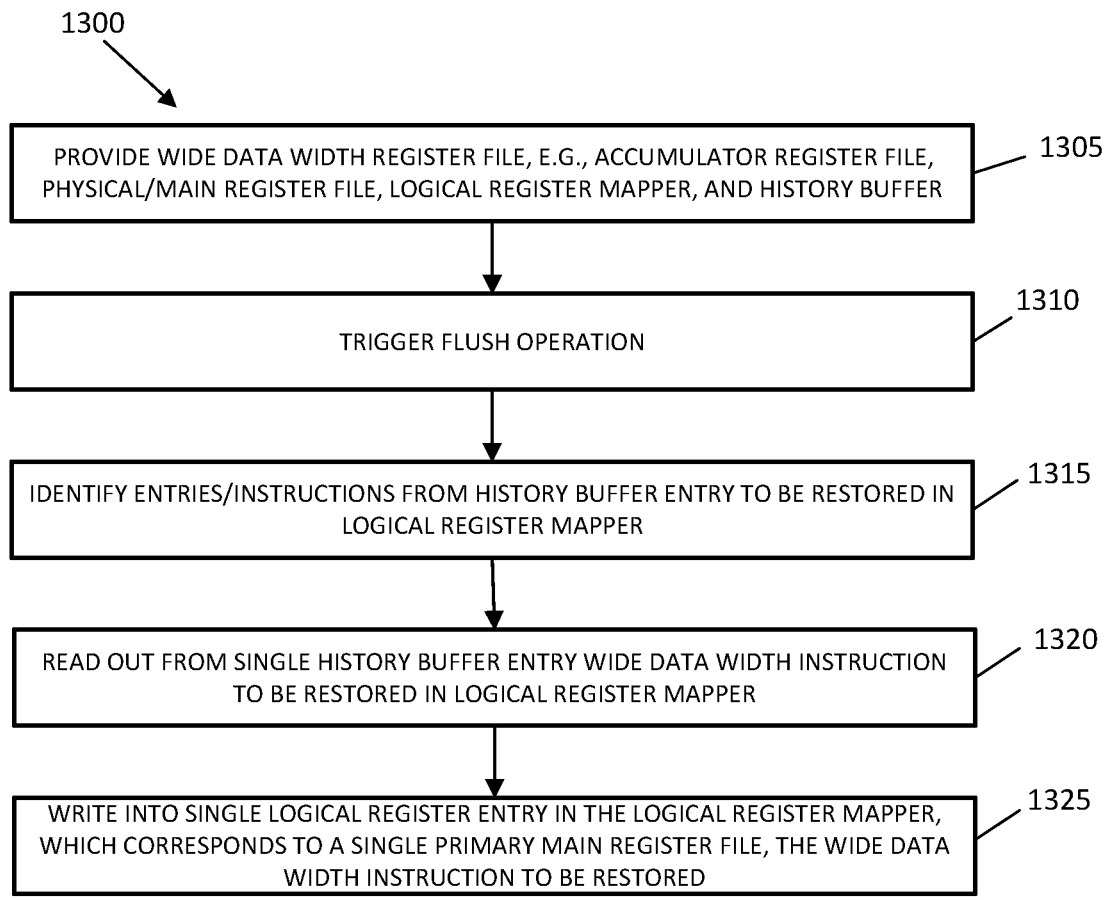
FIG. 13 illustrates a flow chart of a method according to an embodiment for processing wide width data in a processor.

FIG. 13 is an exemplary flowchart in accordance with an embodiment illustrating and describing a method of handling data, e.g., executing instructions, in a processor, including in an embodiment, processing and handling wide data width instructions, e.g., MMA ("ger") instructions, that utilize a wide data width register file, e.g., an accumulator register file, that maps to multiple main register file entries (e.g., STF (VS) register file entries) in a processor. Process 1300 in FIG. 13 in an aspect is more particularly directed to operations to restore a logical register mapper and history buffer in a processor processing wide data width instructions in a wide data width register mapped to multiple smaller data width main register files in response to, for example, an exception, e.g., a flushing operation. While the method 1300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 13, but the process may be integrated and/or one or more steps may be performed together, simultaneously, or the steps may be performed in the order disclosed or in an alternate order.

At 1305, according to one or more embodiments, a wide data width register file (e.g., an accumulator register file), a main physical register file (e.g., a STF (VS) register file), a logical register mapper, and a history buffer are provided. In one or more embodiments, a processor having a pipeline which contains a wide data width register file (e.g., an accumulator register file), a main physical register file (e.g., a STF (VS) register file), a logical register mapper, and a history buffer are provided. In one or more embodiments, the wide data width register file is an accumulator register file that has a plurality of entries, and each entry can hold data having a wider width than the plurality of entries in the main physical register file. In an embodiment, the wide data width register file can store data that is 512 bits while the main physical register file can store data that is 128 bits, and in an aspect four main register files, preferably four consecutive main register files, are grouped to one wide data width register file.

At 1310 an operation, e.g., a flushing operation, is triggered to restore the processor to a prior condition, including for example, restoring the logical register mapper, the wide data width register, e.g., accumulator register, and the main register file to a prior condition. At 1315 the entries and/or instructions from the history buffer to restore to the logical register mapper are identified. At 1320, according to an embodiment, a wide data width instruction to be restored to the logical history buffer is read out from a single history buffer entry preferably from a single history buffer read port. At 1325 the wide data instruction to be restored that is read out of the history buffer is written into a single entry in the logical register mapper. In an embodiment, wide data width instruction information is written through a single logical register write port to the single entry in the logical register mapper corresponding to the single primary main register file mapped to that wide data width register file entry. For example, the accumulator register instruction to be restored, is written to the primary logical register VSR(0) entry in the logical register mapper.

While the illustrative embodiments described above are preferably implemented in hardware, such as in units and circuitry of a processor, various aspects of the illustrative embodiments may be implemented in software as well. For example, it will be understood that each block of the flowchart illustrated in FIGS. 11, 12A, 12B, and 13, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer system for processing information, the computer system comprising:
 a processor, the processor comprising:
  a main register file associated with the processor, the main register file having a plurality of entries for storing data, one or more write ports to write data to the plurality of main register file entries, and one or more read ports to read data from the plurality of main register file entries;
  an accumulator register file having a plurality of entries for storing data, wherein multiple main register file entries are mapped to one accumulator register file entry in the accumulator register file;
  a logical register mapper to track and map logical registers to main register file entries, the logical register mapper having a plurality of entries, wherein each logical register mapper entry has a wide data width bit field identifier, a small data width bit field identifier, and a single STF/ACCtag field configured to hold an ACC Tag that points to an accumulator register file entry or configured to hold a main register file Tag that points to a main register file entry; and
  a history buffer having a plurality of entries, the history buffer to receive information on instructions evicted from the logical register mapper and to restore information on instructions previously evicted from the logical mapper back to the logical register mapper,
 wherein the processor is configured to process wide data width instructions using the accumulator register file and in response to processing wide data width instructions that utilize an accumulator register file entry, evicts information from a single primary entry in the logical register mapper through a single read port in the logical register mapper.

2. The computer system of claim 1, wherein the logical register mapper comprises an ACC Free List that tracks available accumulator register file entries in the accumulator register file, and the processor is configured to obtain an available ACC Tag from the ACC Free List in response to detecting a first wide data width instruction that is to use an accumulator register file entry, wherein the available ACC Tag points to a free accumulator register file entry.

3. The computer system of claim 2, wherein the logical register mapper further comprises an STF Free List that tracks available main register file entries in the main register file.

4. The computer system of claim 1, wherein the processor is configured to, in response to a first wide data width instruction that utilizes the accumulator register file, prime an accumulator register entry by writing data from multiple main register file entries to a mapped accumulator register file entry.

5. The computer system of claim 4, wherein the processor is further configured to evict, in response to the first wide data width instruction, information from the single primary entry in the logical register mapper that corresponds to a single primary main register entry out of the multiple main register file entries mapped to the accumulator register file entry.

6. The computer system of claim 5, wherein the processor is further configured not to evict, in response to the first wide data width instruction, logical register mapper entries corresponding to the multiple main register file entries mapped to the accumulator register file entry other than the single primary logical register mapper entry.

7. The computer system of claim 4, wherein the processor is further configured to read, in response to the first wide data width instruction, non-wide data width instruction information in the single primary entry in the logical register mapper from a single read port in the logical register mapper and write the non-wide data width instruction information to a single history buffer entry by a single history buffer write port.

8. The computer system of claim 7, wherein the processor is further configured to write first wide data instruction information to the single history buffer entry by the single history buffer write port.

9. The computer system of claim 7, wherein the processor is further configured to write first wide data width instruction information to the single primary entry in the logical register mapper to which the non-wide data width instruction information had been written.

10. The computer system of claim 9, wherein the processor is further configured to set, in response to writing the first wide data width instruction information to the single primary logical register mapper entry, the wide data width bit field identifier in the single primary logical register mapper entry.

11. The computer system of claim 10, wherein the processor is further configured to evict, in response to a second wide data width file instruction addressed to the primed accumulator register entry that is subsequent to the first wide data width instruction, the first wide data width instruction information from the single primary logical register mapper entry in the logical register mapper using a single read port in the logical register mapper.

12. The computer system of claim 11, wherein the processor is further configured to read the first wide data width instruction information from the single primary logical register mapper entry in the logical register mapper using the single read port in the logical register mapper and write the first wide data width instruction information into a single history buffer entry using a single write port in the history buffer.

13. The computer system of claim 12, wherein the processor is further configured to write second wide data width instruction information to the single history buffer entry using the single write port in the history buffer.

14. The computer system of claim 13, wherein the processor is further configured to write the second wide data width instruction information to the same single primary logical register mapper entry, and maintain a setting in the wide data width bit field identifier and the ACC Tag in the STF/ACCtag field in the single primary logical register mapper entry.

15. The computer system of claim 9, wherein the processor is further configured to write, in response to writing the first wide data width instruction information to the single primary logical register mapper entry, an available ACC Tag that points to a free accumulator register file entry into the single STF/ACCtag field in the single primary logical register mapper entry.

16. The computer system of claim 1, wherein three or more consecutive main register file entries are mapped to a single accumulator register field.

17. A method for processing information in a processor having an accumulator register file having a plurality of entries, and a main register file having a plurality of entries, wherein a data field in each entry in the accumulator register file is larger than a data field in each entry in the main register file, and each entry in the accumulator register file is configurable to be mapped to multiple of the plurality of entries in the main register file, the method comprising:
- decoding a first wide data width instruction to be executed using the accumulator register file;
- dispatching the first wide data width instruction to a logical register mapper having a plurality of logical register mapper entries and identifying the first wide data width instruction as a wide data width instruction;
- checking an ACC Free List for an available entry in the accumulator register file;
- mapping the available entry in the accumulator register file to multiple of the plurality of main register file entries;
- priming the available entry in the accumulator register file with data from the multiple main register file entries that are mapped to the available accumulator register file entry, wherein the multiple main register file entries include a single primary main register file entry mapped to a single primary entry in the logical register mapper;
- evicting instruction information from the single primary entry in the logical register mapper mapped to the single primary main register file entry through a single read port in the logical register mapper in a single cycle;
- writing at least some of the instruction information from the single primary entry in the logical register mapper into a single entry in a history buffer through a single write port in the history buffer in the single cycle;
- writing information from the first wide data width instruction into the single entry in the history buffer using the single write port in the history buffer in the single cycle;
- writing at least some of the information from the first wide data width instruction into the single primary entry in the logical register mapper through a single write port in the logical register mapper in the single cycle;
- identifying the single primary entry in the logical register mapper as a wide data instruction by setting a bit in a wide data field in the logical register mapper; and
- writing an ACC tag that points to the accumulator register file entry in the single primary entry in the logical register mapper.

18. The method of claim 17, wherein one or more entries in the logical register mapper that correspond to the multiple entries in the main register file that are mapped to the accumulator register file entry, other than the single primary entry having the instruction information evicted from the logical register mapper, are not evicted from the logical register mapper in response to the first wide data width instruction.

19. The method of claim 17, further comprising:
- dispatching a second wide data width instruction subsequent to the first wide data width instruction;
- evicting the at least some of the information from the first wide data width instruction from the single primary logical register mapper entry;
- reading the at least some of the information from the first wide data width instruction from the single read port in the logical register mapper in a second single cycle;
- writing the at least some of the information from the first wide data width instruction to a single entry in the history buffer through the single write port in the history buffer in the second single cycle;
- writing second wide data width instruction information into the single history buffer entry through the single write port in the history buffer in the second single cycle; and
- writing the second wide data width instruction information into the single primary entry in the logical register mapper using the single write port in the logical register mapper in the second single cycle.

20. The method of claim 17, further comprising restoring data from the history buffer to the logical register mapper, wherein restoring data from the history buffer to the logical register mapper comprises:
- identifying a wide data width instruction to be restored in the logical register mapper;
- reading information from a single history buffer entry containing the wide data width instruction that was identified to be restored through a single read port in the history buffer in a single cycle; and
- writing through the single write port in the logical register mapper and into the single primary entry in the logical register mapper that corresponds to the single primary main register file entry, the information read from the single history buffer entry.

* * * * *